US009526987B2

(12) United States Patent
Horita et al.

(10) Patent No.: US 9,526,987 B2
(45) Date of Patent: Dec. 27, 2016

(54) STORAGE MEDIUM, GAME APPARATUS, GAME SYSTEM AND GAME CONTROLLING METHOD

(75) Inventors: Jumpei Horita, Kyoto (JP); Nagako Ikuta, Kyoto (JP); Toyokazu Nonaka, Kyoto (JP); Shin Azuma, Tokyo (JP); Hideki Matsuoka, Tokyo (JP)

(73) Assignees: NINTENDO CO., LTD., Kyoto (JP); KABUSHIKI KAISHA SQUARE ENIX, Tokyo (JP)

( * ) Notice: Subject to any disclaimer, the term of this patent is extended or adjusted under 35 U.S.C. 154(b) by 799 days.

(21) Appl. No.: 13/253,340

(22) Filed: Oct. 5, 2011

(65) Prior Publication Data

US 2012/0083340 A1  Apr. 5, 2012

(30) Foreign Application Priority Data

Oct. 5, 2010  (JP) ................................. 2010-225484

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63F 13/44 | (2014.01) | |
| A63F 13/54 | (2014.01) | |
| A63F 13/814 | (2014.01) | |

(52) U.S. Cl.
CPC .............. *A63F 13/44* (2014.09); *A63F 13/54* (2014.09); *A63F 13/814* (2014.09); *A63F 2300/638* (2013.01); *A63F 2300/8047* (2013.01)

(58) Field of Classification Search
CPC ........................ A63F 13/814; A63F 2300/8047

USPC .......................... 463/30, 35, 36, 39
See application file for complete search history.

(56) References Cited

U.S. PATENT DOCUMENTS

| | | | | |
|---|---|---|---|---|
| 6,342,665 B1 * | 1/2002 | Okita | ................... | A63F 13/005 84/600 |
| 6,913,536 B2 * | 7/2005 | Tomizawa et al. | ............. | 463/43 |

(Continued)

FOREIGN PATENT DOCUMENTS

| | | |
|---|---|---|
| JP | 10-305171 | 11/1998 |
| JP | 2001-321564 | 11/2001 |

(Continued)

OTHER PUBLICATIONS

Guest Critic, "Osu! Tatakae! Ouendan! Review," Feb. 26, 2009, review of a game released Jul. 28, 2005, http://www.gamecritics.com/guest-critic/osu-tatakae-ouendan-review.*

(Continued)

*Primary Examiner* — Kevin Y Kim
(74) *Attorney, Agent, or Firm* — Nixon & Vanderhye P.C.

(57) ABSTRACT

An example game apparatus includes a CPU, and the CPU reproduces a BGM according to BGM data. When a ball object and an item object are shot at a predetermined timing, and a player object catches or receives the ball object at a point of impact, a part of melody of a main theme of the BGM is output. In a case that each player object catches or receives a ball object of the same color as that assigned to the own player object, a correct melody is output, but in a case that it catches or receives a ball object of a different color, a melody being different in pitch is output. Alternatively, in a case that the ball object cannot be caught or received, no melody is output.

17 Claims, 27 Drawing Sheets

(56) References Cited

U.S. PATENT DOCUMENTS

| | | | |
|---|---|---|---|
| 7,009,100 B2* | 3/2006 | Ando | 84/600 |
| 7,128,649 B2* | 10/2006 | Nobe et al. | 463/23 |
| 7,331,856 B1 | 2/2008 | Nakamura et al. | |
| 7,601,056 B2* | 10/2009 | Watanabe | 463/7 |
| 8,197,342 B2* | 6/2012 | Kijima et al. | 463/37 |
| 2001/0016510 A1* | 8/2001 | Ishikawa et al. | 463/7 |
| 2009/0104997 A1* | 4/2009 | Ishida et al. | 463/43 |
| 2009/0209344 A1* | 8/2009 | Okamura | 463/36 |
| 2011/0287839 A1 | 11/2011 | Asami | |
| 2012/0009996 A1* | 1/2012 | Masashi | 463/35 |

FOREIGN PATENT DOCUMENTS

| | | |
|---|---|---|
| JP | 3392120 | 1/2003 |
| JP | 2008-253440 | 10/2008 |
| JP | 2009-247503 | 10/2009 |
| JP | 2010-172442 | 8/2010 |

OTHER PUBLICATIONS

MonotoneTim, "Osu! Tatakae! Ouendan, Stage 1 "Loop and Loop" (With Translations in Annotations)," Published Dec. 12, 2014, gameplay video of a game released Jul. 28, 2005, https://www.youtube.com/watch?v=QfaD3C76qgo.*

LuigiDM, "Osu Tatakae Ouendan—Easy 15 Final—Ready Steady Go," Published Aug. 31, 2012, game released Jul. 28, 2005, https://www.youtube.com/watch?v=mFHcPs7iLfg.*

Charles Onyett, "Audiosurf Review," Feb. 27, 2008, http://www.ign.com/articles/2008/02/28/audiosurf-review.*

Deathsythe, "Audiosurf Basic Guide," Mar. 11, 2008, http://www.neoseeker.com/audiosurf/faqs/164239-deathscythe.html.*

"Beatmania IIDX," Jan. 31, 2005, https://web.archive.org/web/20050131023330/http://en.wikipedia.org/wiki/Beatmania_IIDX.*

Hiroe Super Receive, Wonder Life Special Nintendo Official Guide Book, Mario Party Advance, published by Shogakukan Inc., Mar. 10, 2005, First Edition pp. 48.

Japanese Office Action issued in Application No. 2010-225484 dated Aug. 5, 2014 with English Translation.

Technicbeat, Gekkan Arcadia, published by Enterbrain, Inc., Dec. 1, 2002, vol. 3/$12^{th}$ Issue pp. 68-69.

Technictix, Dengeki PlayStation, published by MediaWorks Inc., Jan. 26, 2001, vol. 7/$3^{rd}$ Issue pp. 174-175.

* cited by examiner

FIG. 3
(A)
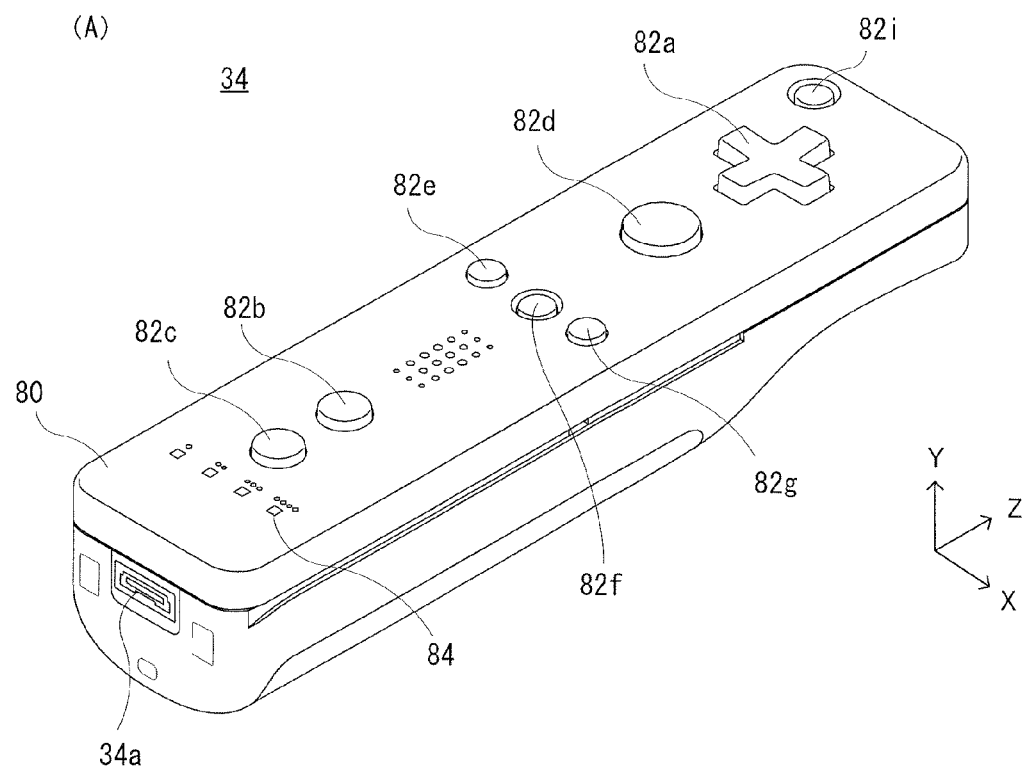
(B)
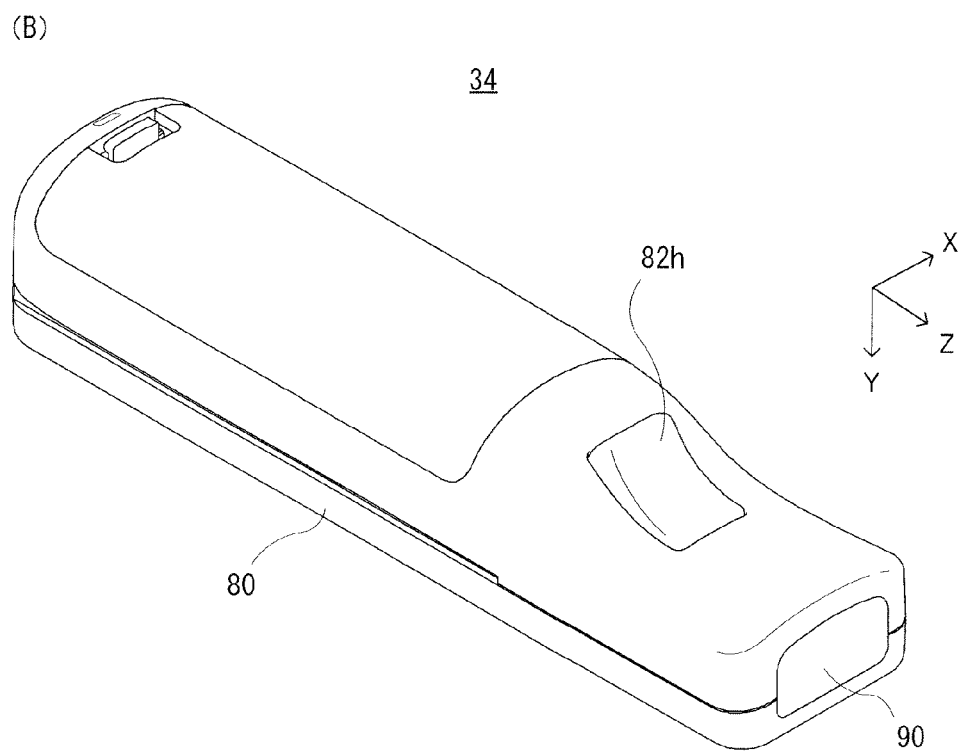

FIG. 4
(A)
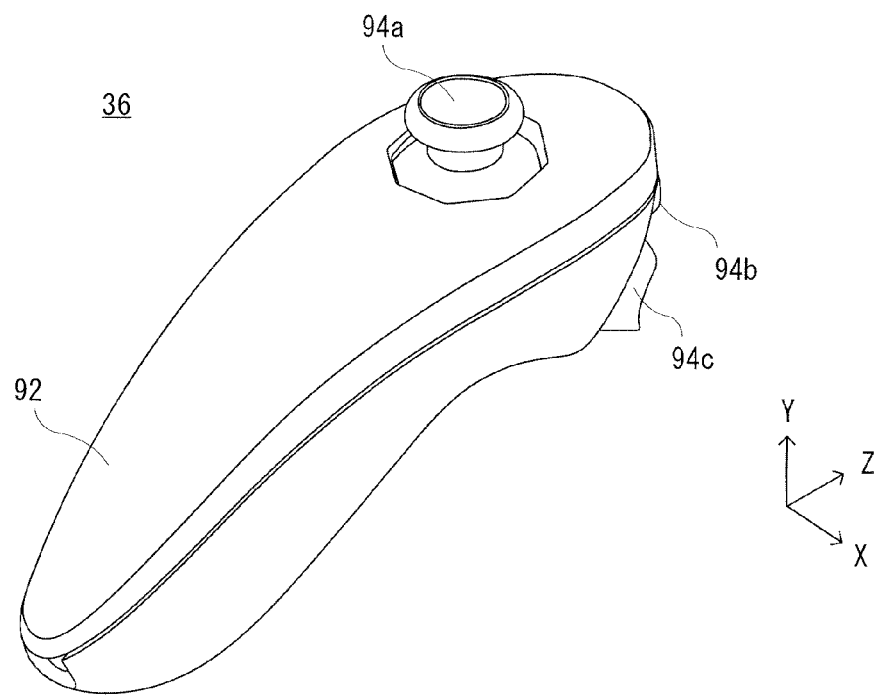
(B)
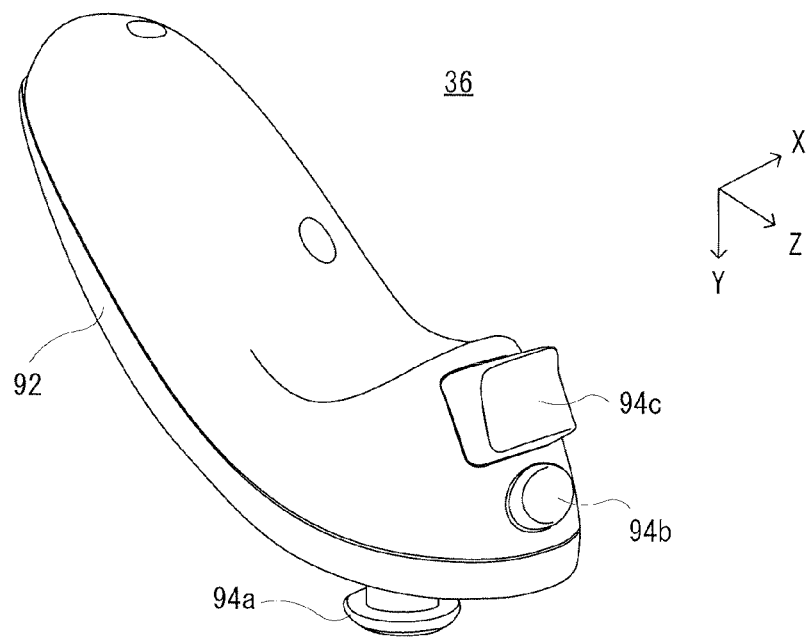

FIG. 10
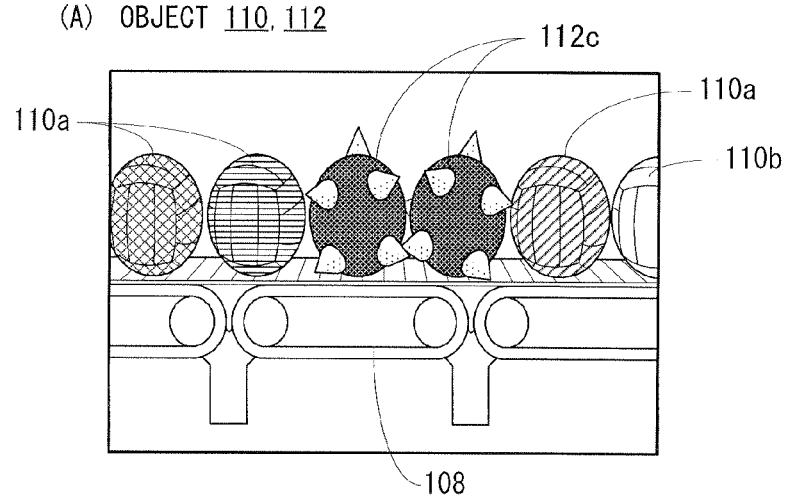
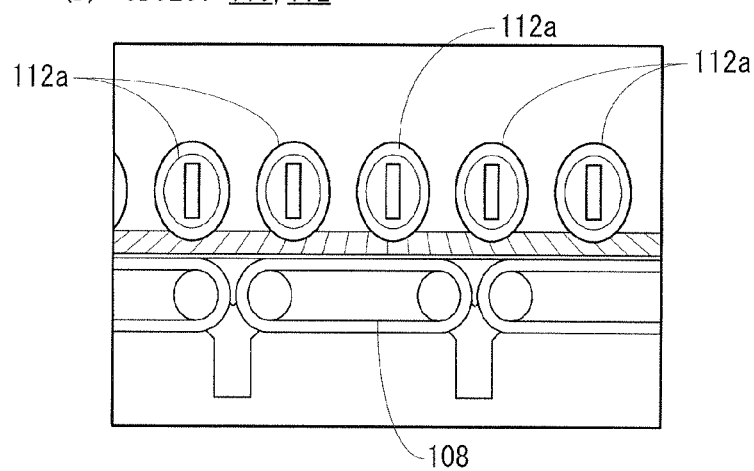
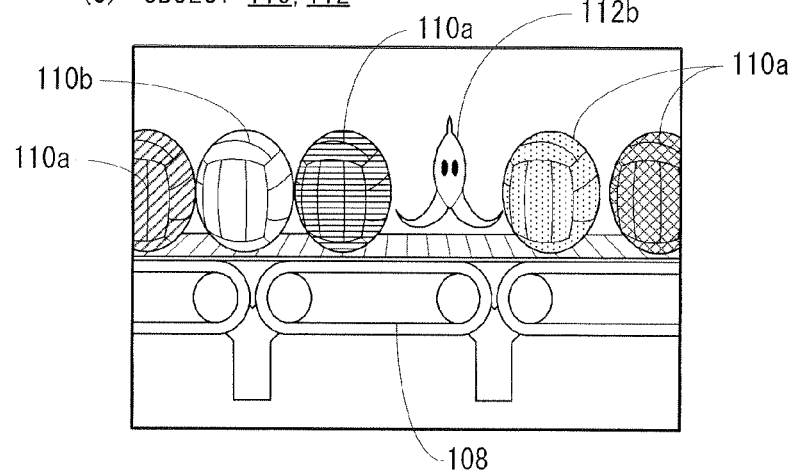

BGM CHANGE TABLE

| DEGREE OF SPLENDOR | MINIMUM | NORMAL | GREAT | EXCELLENT |
|---|---|---|---|---|
| BGM 1 VOLUME | 33% | 100% | 100% | 100% |
| BGM 2 VOLUME | 0% | 0% | 100% | 100% |
| BGM 3 VOLUME | 0% | 0% | 0% | 100% |

FIG. 13

(A) ALIGNMENT INFORMATION

| ARRIVAL ORDER | TRACK 0 | TRACK 1 | TRACK 2 | TRACK 3 | |
|---|---|---|---|---|---|
| 1 | | | | | — START OF BGM (0 FRAME) |
| 2 | | | | | |
| 3 | | | | | |
| 4 | ▨ | | | | |
| 5 | | | | | |
| 6 | | | | | |
| 7 | | ▨ | | | |
| 8 | | | | | |
| 9 | | | | | |
| 10 | | | ▨ | | |
| 11 | | | | | |
| 12 | | | | | |
| 13 | | | | | |
| 14 | | | | ▨ | |
| 15 | | | | | |
| 16 | | ▨ | | | |
| 17 | | | | | |
| 18 | ▨ | | | | |
| 19 | | | | | |
| ⋮ | ⋮ | ⋮ | ⋮ | ⋮ | |
| M−3 | | | ▨ | | |
| M−2 | | | | | |
| M−1 | | | | ▨ | |
| M | | | | | — END OF BGM |

▨ ⋯OBJECT INFORMATION (B) OBJECT INFORMATION

| REPRODUCTION TIMING FRAME | CLASSIFICATION | FLYING TIME | MINIMUM DISTANCE | MAXIMUM DISTANCE | SPECIAL FLAG |
|---|---|---|---|---|---|

FIG. 14

SHOOT TIMING TABLE

| SHOOT TIMING FRAME | TRACK NUMBER, ARRIVAL ORDER |
|---|---|
| $f_1$ | T0, 4 |
| $f_2$ | T2, 10 |
| $f_3$ | T1, 7 |
| $f_4$ | T3, 14 |
| $f_5$ | T1, 16 |
| $f_6$ | T0, 18 |
| ⋮ | ⋮ |
| $f_{N-1}$ | T4, M−2 |
| $f_N$ | T3, M−3 |

FIG. 15
(A) DECIDING METHOD OF POINT OF IMPACT AND ANGLE $\phi$ IN HORIZONTAL DIRECTION
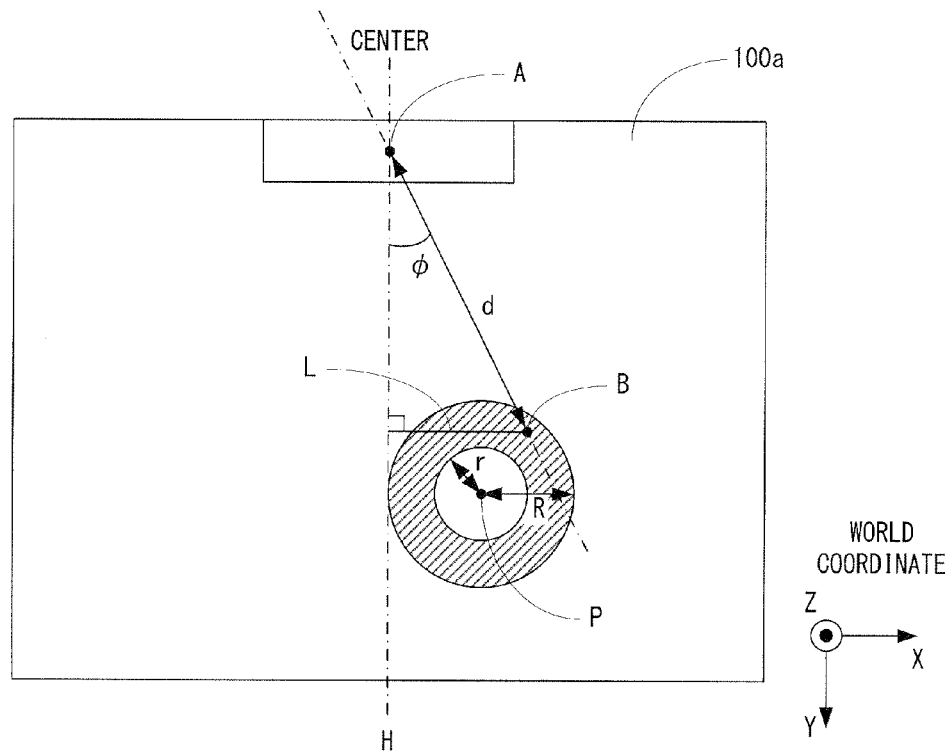
(B) DECIDING METHOD OF INITIAL VELOCITY v AND ANGLE $\theta$ IN VERTICAL DIRECTION
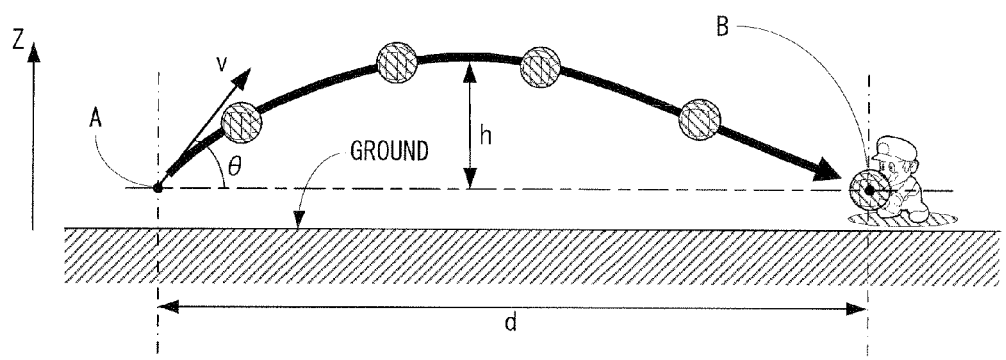

FIG. 17

DATA MEMORY AREA 504

| | |
|---|---|
| OPERATION DATA BUFFER 504a | HORIZONTAL ANGLE DATA 504i |
| IMAGE DATA 504b | VERTICAL ANGLE DATA 504j |
| BGM DATA 504c | VELOCITY DATA 504k |
|   FIRST BGM DATA 5040 | SCORE DATA 504m |
|   SECOND BGM DATA 5042 | FRAME COUNTER 504n |
|   ... | CONSECUTIVE CATCH COUNTER 504p |
| THROWING DATA 504d | IMMOVABLE TIME TIMER 504q |
|   FIRST ALIGNMENT INFORMATION DATA 5050 | MINIMUM FLAG 504r |
|   SECOND ALIGNMENT INFORMATION DATA 5052 | NORMAL FLAG 504s |
|   ... | GREAT FLAG 504t |
| NOTE DATA 504e | EXCELLENT FLAG 504u |
| PLAYER INFORMATION DATA 504f | IMMOVABLE FLAG 504v |
| TRACK ASSIGNMENT DATA 504g | DAMAGE FLAG 504w |
| SHOOT DATA 504h | ... |

FIG. 27
(A) COIN OBJECT
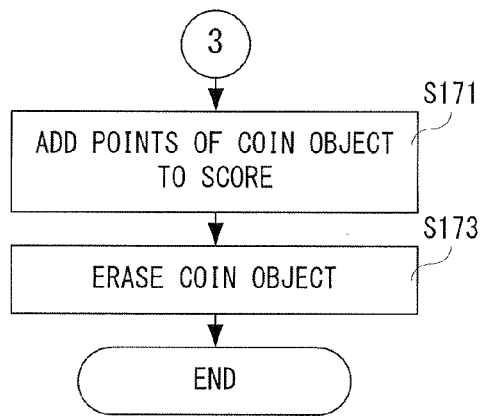
(B) BANANA OBJECT
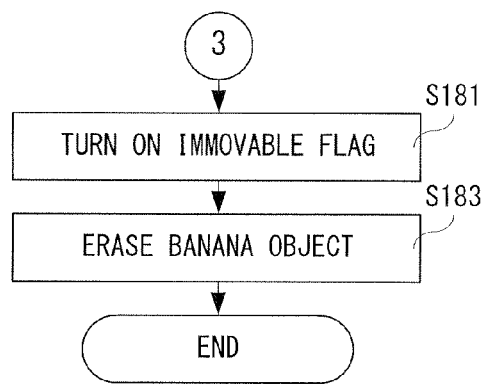
(C) IRON BALL OBJECT
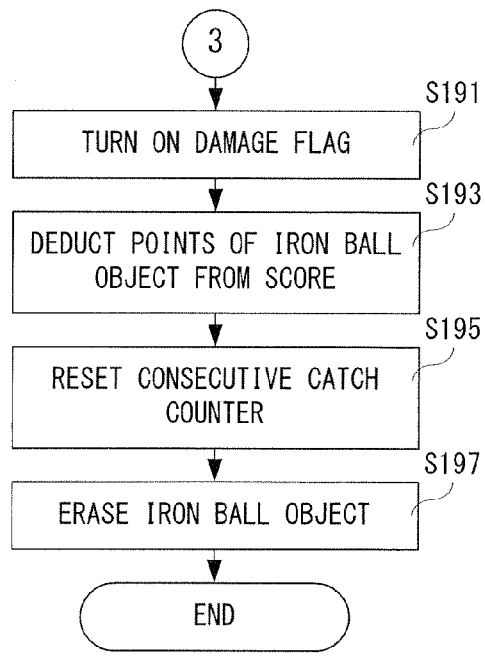

STORAGE MEDIUM, GAME APPARATUS, GAME SYSTEM AND GAME CONTROLLING METHOD

CROSS REFERENCE OF RELATED APPLICATION

The disclosure of Japanese Patent Application No. 2010-225484 filed on Oct. 5, 2010 is incorporated herein by reference.

FIELD

The example embodiment relates to a storage medium, game apparatus, game system and game controlling method. More specifically, the present embodiment relates to a storage medium, game apparatus, game system and game controlling method which performs a rhythm game.

SUMMARY

It is a primary object of the example embodiment to provide a storage medium, game apparatus, game system and game controlling method capable of offering a novel rhythm game.

A first embodiment is a storage medium storing a game program of a game apparatus to perform a rhythm game provided with a timing data storage storing timing data set to music, and the game program causes a computer of the game apparatus to function as a player object controller, an object mover, a determiner, and a sound controller. The player object controller moves a player object in a game space based on an operation by a player. The object mover sets an arrival position of an object for determination, and moves the object for determination so as to arrive at the arrival position at a timing indicated by the timing data. The determiner performs a success determination depending on whether or not the player object is positioned within a first predetermined range from the arrival position for a predetermined period including the timing. The sound controller controls a sound output based on a result of a determination by the determiner.

According to the first embodiment, the object for determination is moved so as to arrive at the arrival position at a timing indicated by the timing data, and a sound output is controlled depending on whether or not the player object exists within the predetermined range from the arrival position of the object for determination, and therefore, it is possible to offer a rhythm game of a new sense unlike rhythm games to be played by merely operating the operating switch according to timing.

A second embodiment is according to the first embodiment, wherein the object mover sets the arrival position such that the object for determination arrives at a position a second predetermined range away from the position of the player object.

According to the second embodiment, the arrival position of the object for determination can be set to the position within the predetermined range from the position of the player object, and therefore, it is possible to easily decide the arrival position. Furthermore, in a case that the predetermined range is set to the distance allowing the player object to move, a disadvantage of setting a position at which the player object cannot arrive as the arrival position of the object for determination never occurs.

A third embodiment is according to the first embodiment, wherein the object mover sets the arrival position such that the object for determination arrives at a position predetermined distance away from the position of the player object.

According to the third embodiment, the object for determination arrives at the position the predetermined distance away from the position of the player object, and therefore, it is possible to easily decide the arrival position similarly to the second embodiment. Furthermore, the arrival position is never set in the vicinity of the player object, and therefore, a disadvantage of obtaining a good determination result without operating the player object never occurs.

A fourth embodiment is according to the first embodiment, wherein the player object controller moves the player object based on a direction input operation performed on an operating device. The determiner performs the success determination depending on whether or not the player object moves into a third predetermined range including the first predetermined range from the arrival position by the timing, and a swinging operation of the operating device is performed within the predetermined period.

According to the fourth embodiment, in a case that a swinging operation of the operating device is performed within the predetermined period, a success determination is performed within the larger range such as a third predetermined range including the first predetermined range, and the player object is never merely moved, and an operation does not become monotonous.

A fifth embodiment is according the first embodiment, wherein the player object controller moves the player object on the basis of a direction input operation performed on the operating device. The determiner performs the success determination depending on whether or not the player object moves into a third predetermined range including the first predetermined range from the arrival position by the timing, and a predetermined key operation is performed on the operating device within the predetermined period.

In the fifth embodiment also, similar to the fourth embodiment, an operation does not become monotonous, and thus, it is possible to prevent an interest in the game from being reduced.

A sixth embodiment is according to the first embodiment, wherein the sound controller outputs sound effect representing success when success is determined by the determiner, and outputs sound effect representing failure when failure is determined by the determine.

According to the sixth embodiment, different sound effects are output depending on a case of success or a case of failure. For example, in the case of success, sound effects in accordance with the music are output to thereby give the player exhilaration, and in the case of failure, unpleasant sound such as dissonance is output, to thereby give the player the willingness to succeed.

A seventh embodiment is according to the first embodiment, wherein the sound controller outputs the music in relation to the timing data as a BGM, and at least one of volume and part of the BGM is increased when success is determined by the determiner, and at least one of the volume and the part of the BGM is decreased when failure is determined by the determiner.

According to the seventh embodiment, when success is determined, splendor of the BGM can be increased, and when failure is determined, splendor of the BGM can be decreased.

An eighth embodiment is according to the first embodiment, wherein the player object controller moves each of a plurality of player objects according to an operation by each of a plurality of players. The object mover sets the arrival position of the object for determination on the basis of a position of any one of the plurality of player objects.

According to the eighth embodiment, in a case that a plurality of player objects exist, the arrival position of the object for determination is set on the basis of any one of the positions, and therefore, it is possible to easily set the arrival position. Furthermore, playing in cooperation with a plurality of players may be possible.

A ninth embodiment is according to the eighth embodiment, wherein the object for determination has an appearance capable of identifying a corresponding player object. The object mover decides the arrival position on the basis of the position of the corresponding player object.

According to the ninth embodiment, an object for determination of an appearance capable of identifying the player object is provided, and therefore, the player can easily know the object for determination corresponding to the own player object. Furthermore, even in a case that a plurality of player objects exist, it is possible to easily set the arrival position of the object for determination.

A tenth embodiment is according to the ninth embodiment, wherein the game program causes a computer to further function as: a marker displayer which displays, at the arrival position, an index indicating the first predetermined range so as to identify the corresponding player object.

According to the tenth embodiment, the index indicating the first predetermined range is displayed at the arrival position of the object for determination, and thus, the player object is moved by merely seeing this index, allowing a relatively easy movement operation.

An eleventh embodiment is according to the first embodiment, the game program causes a computer to further function as an arranger and an item processor. The arranger arranges an item object other than the object for determination in the game space. The item processor gives the player object a predetermined effect depending on whether or not the player object touches the item object.

According to the eleventh embodiment, the item is arranged, and if the player object touches the item, the predetermined advantage is given, and therefore, it is possible to add other game elements to the rhythm game. Thus, it is possible to increase fun of the game.

A twelfth embodiment is a game apparatus performing a rhythm game, and comprises a timing data storage, a player object controller, an object mover, a determiner, a sound controller. The timing data storage stores timing data set to music. The player object controller moves a player object in a game space based on an operation by a player. The object mover sets an arrival position of an object for determination, and moves the object for determination so as to arrive at the arrival position at a timing indicated by the timing data. The determiner performs a success determination depending on whether or not the player object is positioned within a first predetermined range from the arrival position for a predetermined period including the timing. The sound controller controls a sound output based on a result of a determination by the determiner.

A thirteenth embodiment is a game system performing a rhythm game, and comprises a timing data storage, a player object controller, an object mover, a determiner, and a sound controller. The timing data storage stores timing data set to music. The player object controller moves a player object in a game space based on an operation by a player. The object mover sets an arrival position of an object for determination, and moves the object for determination so as to arrive at the arrival position at a timing indicated by the timing data. The determiner performs a success determination depending on whether or not the player object is positioned within a first predetermined range from the arrival position for a predetermined period including the timing. The sound controller controls a sound output based on a result of a determination by the determiner.

A fourteenth embodiment is a game controlling method of a game apparatus performing a rhythm game, the game apparatus including a timing data storage storing timing data set to music, comprising the steps of: (a) moving a player object in a game space based on an operation by a player; (b) setting an arrival position of an object for determination, and moving the object for determination so as to arrive at the arrival position at a timing indicated by the timing data; (c) performing a success determination depending on whether or not the player object is positioned within a first predetermined range from the arrival position for a predetermined period including the timing; (d) controlling a sound output based on a result of a determination by the step (c).

According to the twelfth to fourteenth embodiments also, similar to the first embodiment, it is possible to provide a rhythm game of a new sense.

The above described objects and other objects, features, aspects and advantages of the embodiment invention will become more apparent from the following detailed description of the embodiment invention when taken in conjunction with the accompanying drawings.

BRIEF DESCRIPTION OF THE DRAWINGS

FIG. 3 shows an example non-limiting appearance of a first controller;

FIG. 4 shows an example non-limiting appearance of a second controller;

FIG. 10 shows an example non-limiting ball objects and item objects to be displayed on the game screen shown in FIG. 9;

FIG. 13 shows an example non-limiting alignment information to be set in correspondence with BGM;

FIG. 14 shows an example non-limiting shoot timing table;

FIG. 15 shows an example non-limiting deciding method of a point of impact and a moving direction of a ball object and an item object;

FIG. 17 shows an example non-limiting detailed contents of a data memory area of the main memory shown in FIG. 16;

FIG. 27 shows an example non-limiting another part of the moving and determining processing (item object) by the CPU shown in FIG. 2;

DETAILED DESCRIPTION OF NON-LIMITING EXAMPLE EMBODIMENTS

Figure 1:
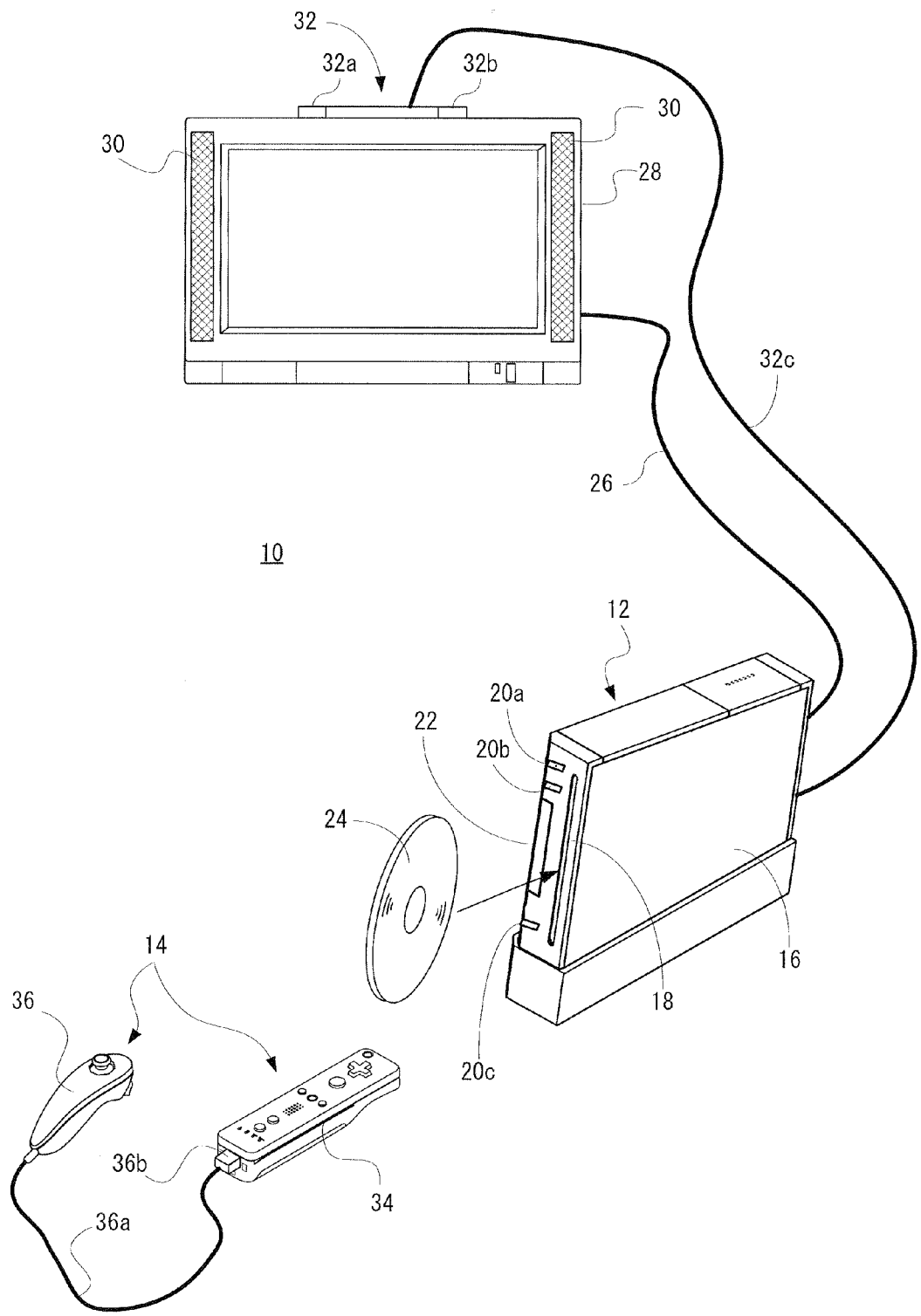
FIG. 1 shows an example non-limiting game system.

Referring to FIG. 1, a game system 10 of this embodiment includes a game apparatus 12 and a controller 14. Although illustration is omitted, the game apparatus 12 of this embodiment is designed such that it can be connected to four controllers 14 at the maximum. Furthermore, the game apparatus 12 and each of the controllers 14 are wirelessly connected. For example, the wireless communication is executed according to Bluetooth (registered trademark) standard, but may be executed by other standards such as infrared rays, a wireless LAN, etc. Alternatively, they may be connected by wire.

The game apparatus 12 includes a roughly rectangular parallelepiped housing 16, and the housing 16 is furnished with a disk slot 18 on a front surface. From the disk slot 18, an optical disk 24 as one example of an information storage medium storing a game program, etc. is inserted to be loaded into a disk drive 54 (see FIG. 2) within the housing 16. Although the illustration is omitted, around the disk slot 18, an LED and a light guide plate are arranged so as to make the disk slot 18 light up or blink in response to various processing.

Furthermore, on a front surface of the housing 16 of the game apparatus 12, a power button 20a and a reset button 20b are provided at the upper part thereof, and an eject button 20c is provided below them. In addition, a connector cover for external memory card 22 is provided between the reset button 20b and the eject button 20c, and in the vicinity of the disk slot 18. Inside the connector cover for external memory card 22, a connector for external memory card 62 (see FIG. 2) is provided, through which an external memory card 38 (hereinafter simply referred to as a "memory card 38") not shown is inserted. The memory card is employed for loading the game program, etc. read from the optical disk 24 to temporarily store it, storing (saving) game data (result data, proceeding data of the game, or replay data described later) of the game played by means of the game system 10, and so forth. Here, storing the game data described above may be performed on an internal memory, such as a flash memory 44 (see FIG. 2) provided inside the game apparatus 12 in place of the memory card 38. Also, the memory card 38 may be utilized as a backup memory of the internal memory. In addition, in the game apparatus 12, an application other than the game can be executed, and in such a case, data of the other application can be saved in the memory card 38.

It should be noted that a general-purpose SD card can be employed as a memory card 38, but other general-purpose memory cards, such as memory sticks, multimedia cards (registered trademark) can be employed. The memory card 38 can be utilized in other game apparatuses 12 having a construction similar to the game apparatus 12, and thus, it is possible to offer the game data to other players via the memory card 38.

Although omitted in FIG. 1, the game apparatus 12 has an AV cable connector 58 (see FIG. 2) on the rear surface of the housing 16, and by utilizing the AV cable connector 58, a monitor 28 and a speaker 30 are connected to the game apparatus 12 through an AV cable 26. The monitor 28 and the speaker 30 are typically a color television receiver, and through the AV cable 26, a video signal from the game apparatus 12 is input to a video input terminal of the color television, and a sound signal from the game apparatus 12 is input to a sound input terminal thereof. Accordingly, a virtual three-dimensional game image of a three-dimensional (3D) video game, for example, is displayed on the screen of the color television (monitor) 28, and stereo game sound, such as a game music, a sound effect, etc. is output from right and left speakers 30. Around the monitor 28 (on the top side of the monitor 28, in this embodiment), a marker unit 32 including two infrared ray LEDs (markers) 32a and 32b is provided. The marker unit 32 is connected to the game apparatus 12 through a power source cable 32c. Accordingly, the marker unit 32 is supplied with power from the game apparatus 12. Thus, the markers 32a and 32b emit light beams so as to output infrared rays ahead of the monitor 28.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

The controller 14, which is described in detail later, includes a first controller 34 and a second controller 36, each capable of being held with one hand, as a first operation unit and a second operation unit, respectively. A cable 36a has one end extending from the rear end of the second controller 36 and the other end provided with a connector 36b. The connector 36b is connected to a connector 34a (FIG. 3, FIG. 5) provided on a rear end surface of the first controller 34. Input data obtained by the second controller 36 is applied to the first controller 34 through the cable 36a. The first controller 34 transmits controller data including the input data of the first controller 34 itself and the input data of the second controller 36 to the game apparatus 12.

In the game system 10, a user or a player turns the power of the game apparatus 12 on for playing the game (or applications other than the game) by a power switch 20a. Then, the user selects an appropriate optical disk 24 recording a program of a video game (or other applications the player wants to play), and loads the optical disk 24 into the disk drive 54 of the game apparatus 12. In response thereto, the game apparatus 12 starts to execute the video game or the other applications on the basis of the program recorded in the optical disk 24. The user operates the controller 14 in order to apply an input to the game apparatus 12. For example, by operating any one of the operating buttons of the operating portion 82, a game or other application is started. Besides the operation performed on operating portion 82, by moving the controller 14 itself, it is possible to move a moving image object (player object) in different directions or change the perspective of the user (camera position of the virtual game) in a three-dimensional game world.

It should be noted that the video game and other application programs are stored (installed) in an internal memory (flash memory 44 (see FIG. 2)) of the game apparatus 12, and may be executed in the internal memory. In such a case, a program stored in a storage medium like an optical disk 24 may be installed in the internal memory, and the downloaded program may be installed in the internal memory.

Figure 2:
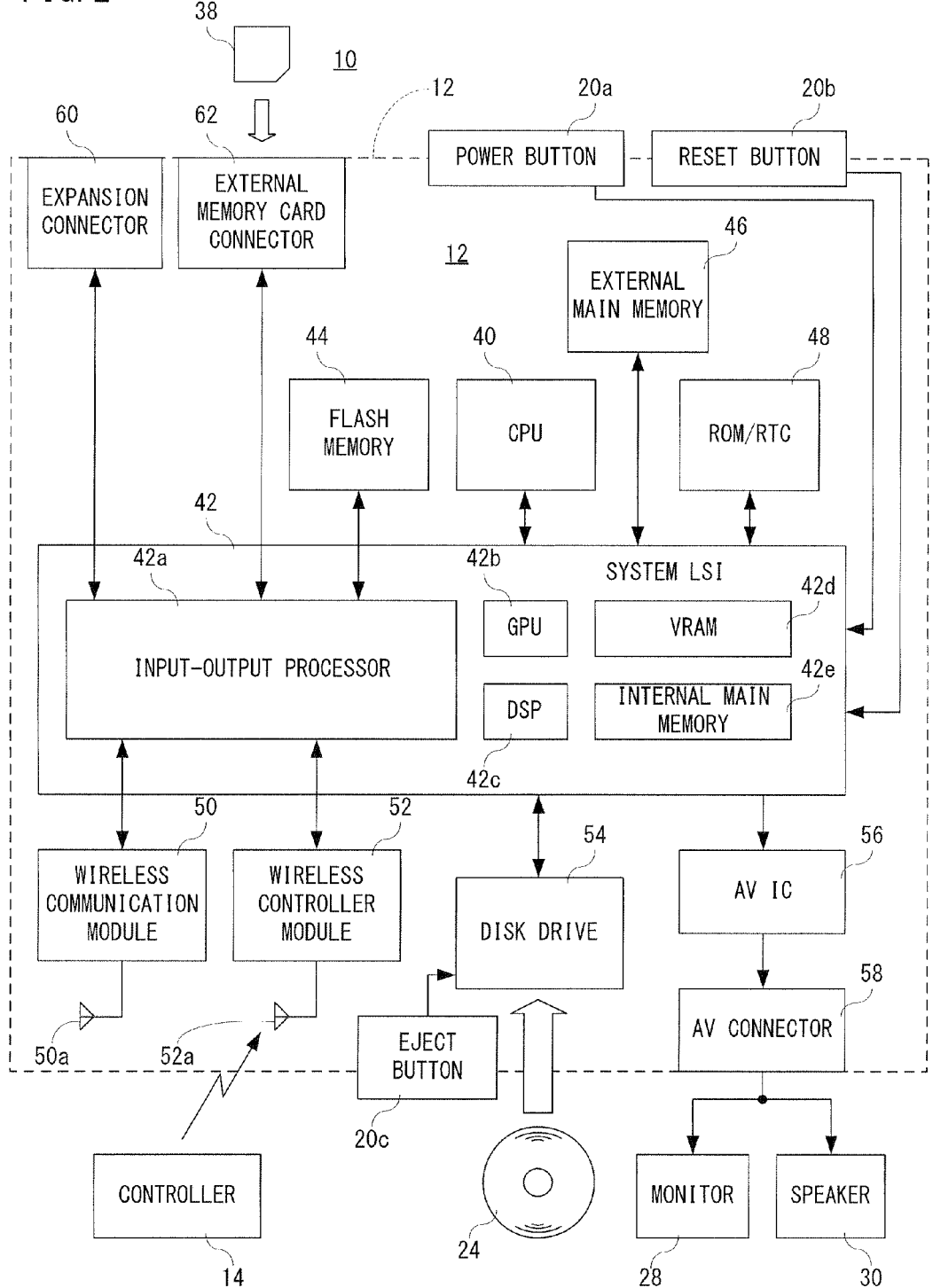
FIG. 2 shows an example non-limiting electric configuration of the game system.

FIG. 2 shows an example non-limiting electric configuration of the game system 10 shown in FIG. 1 embodiment. Although illustration is omitted, respective components within the housing 16 are mounted on a printed board. As shown in FIG. 2, the game apparatus 12 has a CPU 40 functioning as a game processor. The CPU 40 is connected with a system LSI 42. The system LSI 42 is connected with an external main memory 46, a ROM/RTC 48, the disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program, texture data etc. from the optical disk 24, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted. The input-output processor (I/O processor) 42a executes transmission and reception of data and executes download of the data. The GPU 42b is made up of a part of a depicting means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction command. Here, the CPU 40 writes image data required for depicting to the VRAM 42d via the GPU 42b. The GPU 42b accesses the VRAM 42d to create game image data for depicting.

In this embodiment, a case that the GPU 42b generates game image data is explained, but in a case that an arbitrary application except for the game application is executed, the GPU 42b generates image data as to the arbitrary application.

Furthermore, the DSP 42c functions as an audio processor, and generates audio data corresponding to a sound (sound effect), a voice, music (BGM), or the like to be output from the speaker 30 by means of the sound data and the sound wave (tone) data stored in the internal main memory 42e and the external main memory 46.

The game image data and audio data generated as described above are read by the AV IC 56, and output to the monitor 28 and the speaker 30 via the AV connector 58. Accordingly, a game screen is displayed on the monitor 28, and a sound (music) necessary for the game is output from the speaker 30.

Furthermore, the input-output processor 42a is connected with a flash memory 44, a wireless communication module 50 and a wireless controller module 52, and is also connected with an expansion connector 60 and a connector for external memory card 62. The wireless communication module 50 is connected with an antenna 50a, and the wireless controller module 52 is connected with an antenna 52a.

The input-output processor 42a can communicate with other game apparatuses and servers (both of them are not shown) to be connected to a network via the wireless communication module 50 although not shown. However, it may be possible to directly communicate with other game apparatus without networks. The input-output processor 42a periodically accesses the flash memory 44 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 42a receives data (referred to as received data) transmitted from another game apparatuses via the network, the antenna 50a and the wireless communication module 50, and stores the received data in the flash memory 44. In a case that the received data does not satisfy a predetermined condition, the reception data is abandoned as it is. In addition, the input-output processor 42a can receive data (download data) downloaded from the server connected to the network via the network the antenna 50a and the wireless communication module 50, and store the download data in the flash memory 44.

Furthermore, the input-output processor 42a receives input data transmitted from the controller 14 via the antenna 52a and the wireless controller module 52, and (temporarily) stores it in the buffer area of the internal main memory 42e or the external main memory 46. The input data is erased from the buffer area after being utilized in processing (game processing, for example) by the CPU 40.

In addition, the input-output processor 42a is connected with the expansion connector 60 and the connector for external memory card 62. The expansion connector 60 is a connector for interfaces, such as USB, SCSI, etc., and can be connected with medium such as an external storage and peripheral devices such as another controller different from the controller 14. Furthermore, the expansion connector 60 is connected with a cable LAN adaptor, and can utilize the cable LAN in place of the wireless communication module 50. The connector for external memory card 62 can be connected with an external storage like a memory card 38. Thus, the input-output processor 42a, for example, accesses the external storage via the expansion connector 60 and the connector for external memory card 62 to store and read the data.

Although a detailed description is omitted, as shown in FIG. 1 as well, the game apparatus 12 (housing 16) is furnished with the power button 20*a*, the reset button 20*b*, and the eject button 20*c*. The power button 20*a* is connected to the system LSI 42. When the power button 20*a* is turned on, the system LSI 42 is set to a mode of a normal energized state (referred to as "normal mode") in which the respective components of the game apparatus 12 are supplied with power through an AC adapter not shown. On the other hand, when the power button 20*a* is turned off, the system LSI 42 is set to a mode (hereinafter referred to as "standby mode") in which a part of the components of the game apparatus 12 is supplied with power, and the power consumption is reduced to minimum.

In this embodiment, in a case that the standby mode is set, the system LSI 42 issues an instruction to stop supplying the power to the components except for the input-output processor 42*a*, the flash memory 44, the external main memory 46, the ROM/RTC 48 and the wireless communication module 50, and the wireless controller module 52. Accordingly, in this embodiment, in the standby mode, the CPU 40 never executes an application.

The reset button 20*b* is also connected to the system LSI 42. When the reset button 20*b* is pushed, the system LSI 42 restarts a start-up program of the game apparatus 12. The eject button 20*c* is connected to the disk drive 54. When the eject button 20*c* is pushed, the optical disk 24 is ejected from the disk drive 54.

FIG. 3 shows an example non-limiting external appearance of the first controller 34. FIG. 3 (A) shows an example non-limiting first controller 34 as seeing it from above rear, and FIG. 3 (B) shows an example non-limiting first controller 34 as seeing it from below front. The first controller 34 has a housing 80 formed by plastic molding, for example. The housing 80 is formed into an approximately rectangular parallelepiped shape regarding a back and forth direction (Z-axis direction shown in FIG. 3) as a longitudinal direction, and has a size small enough to be held by one hand of a child and an adult. As one example, the housing 80 has a length or a width approximately the same as that of the palm of the person. A player can perform a game operation by means of the first controller 34, that is, by pushing buttons provided on it and by changing a position and a direction of the first controller 34 by moving the first controller 34 itself.

The housing 80 is provided with a plurality of operation buttons (operation key). That is, on the top surface of the housing 80, a cross key 82*a*, a 1 button 82*b*, a 2 button 82*c*, an A button 82*d*, a –button 82*e*, a menu button 82*f*, and a +button 82*g* are provided. Meanwhile, on the bottom surface of the housing 80, a concave portion is formed, and on the reward inclined surface of the concave portion, a B button 82*h* is provided. Each of the buttons (switches) 82*a*-82*h* is assigned an appropriate function according to a game program to be executed by the game apparatus 12. Furthermore, on the top surface of the housing 80, a power switch 82*i* for turning on/off the power of the main body of the game apparatus 12 from a remote place is provided. The respective buttons (switches) provided on the first controller 34 may inclusively be indicated with the use of the reference numeral 82.

At the back surface of the housing 80, the above-described connector 34*a* is provided. The connector 34*a* is a 32 pin edge connector, for example, and utilized for connecting other devices to the first controller 34. In this embodiment, the connector 34*a* is connected with the connector 36*b* of the second controller 36. At the back end of the top surface of the housing 80, a plurality of LEDs 84 are provided, and the plurality of LEDs 84 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the connecting order, for example. Each LED 84 corresponds to the controller number, and the LED 84 corresponding to the controller number lights up.

Furthermore, inside the housing 80 of the first controller 34, an acceleration sensor 86 (FIG. 5) is provided. As an acceleration sensor 86, acceleration sensors of an electrostatic capacity type can typically be utilized. The acceleration sensor 86 detects accelerations of a linear component for each sensing axis and gravitational acceleration out of the accelerations applied to a detection portion of the acceleration sensor. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34.

It should be noted that as an acceleration sensor 86, two-axis acceleration sensors may be utilized for detecting any two of the directions of the accelerations out of the up and down direction, the right and left direction and the back and forth direction according to the shape of the housing 80, the limitation on how to hold the first controller 34, or the like. Under certain circumstances, a one-axis acceleration sensor may be used.

Figure 5:
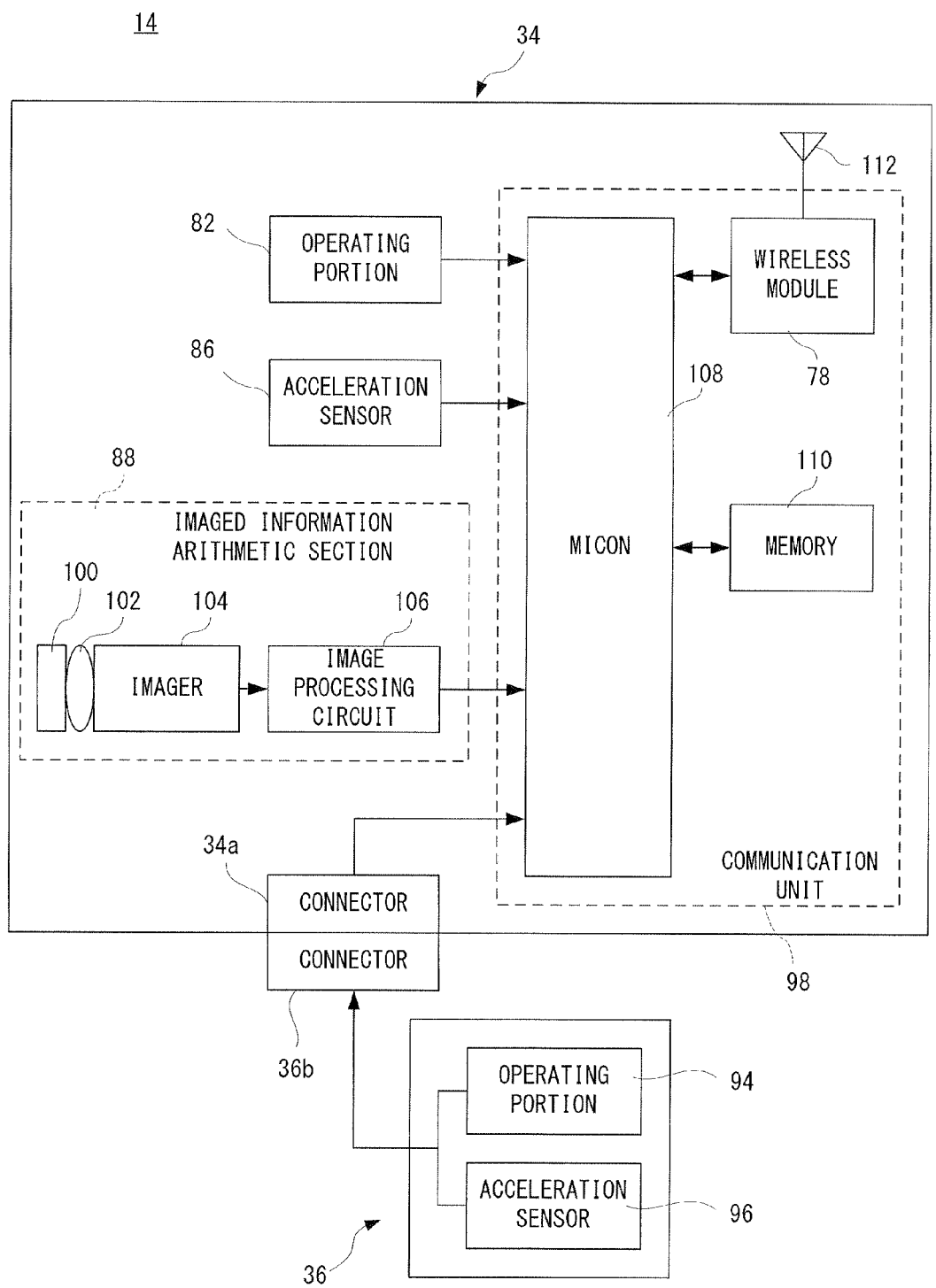
FIG. 5 shows an example non-limiting electric configuration of controllers (first controller and second controller)

In addition, the first controller 34 has an imaged information arithmetic section 88 (see FIG. 5). As shown in FIG. 3 (B), on the front end surface of the housing 80, a light incident opening 90 of the imaged information arithmetic section 88 is provided, and from the light incident opening 90, infrared rays emitted by the markers 44*m* and 44*n* of the sensor bar 44 are caught.

FIG. 4 shows an example non-limiting appearance of the second controller 36. FIG. 4 (A) shows an example non-limiting second controller 36 as seeing it from above rear, and FIG. 4 (B) shows an example non-limiting second controller 36 as seeing it from below front. Additionally, in FIG. 4, the cable 36*a* of the second controller 36 is omitted.

The second controller 36 has a housing 92 formed by plastic molding, for example. The housing 92 is formed into an approximately thin long elliptical shape in the forward and backward directions (Z-axis direction in FIG. 4) when viewed from plan, and the width of the right and left direction (X-axis direction in FIG. 4) at the back end is narrower than that of the front end. Furthermore, the housing 92 has a curved shape as a whole when viewed from a side, and downwardly curved from a horizontal portion at the front end to the back end. The housing 92 has a size small enough to be held by one hand of a child and an adult similar to the first controller 34 as a whole, and has a longitudinal length (in the Z-axis direction) slightly shorter than that of the housing 80 of the first controller 34. Even with the second controller 36, the player can perform a game operation by operating buttons and a stick, and by changing a position and a direction of the controller by moving itself.

At the end of the top surface of the housing 92, an analog joystick 94*a* is provided. At the end of the housing 92, a front edge slightly inclined backward is provided, and on the front edge are provided a C button 94*b* and a Z button 94*c* vertically arranged (Y-axis direction in FIG. 4). The analog joystick 94*a* and the respective buttons 94*b* and 94*c* are assigned appropriate functions according to a game program to be executed by the game apparatus 12. The analog joystick 94*a* and the respective buttons 94*b* and 94*c* provided to the second controller 36 may be inclusively denoted by means of the reference numeral 94.

Inside the housing 92 of the second controller 36, an acceleration sensor 96 (FIG. 5) is provided. As the acceleration sensor 96, an acceleration sensor similar to the acceleration sensor 86 in the first controller 34 is applied. More specifically, the three-axis acceleration sensor is applied in this embodiment, and detects accelerations in the respective three axis directions like an up and down direction (Y-axial direction shown in FIG. 4), a right and left direction (X-axial direction shown in FIG. 4), and a forward and backward direction (Z-axial direction shown in FIG. 4) of the second controller 36.

Additionally, the shapes of the first controller 34 shown in FIG. 3 and the second controller 36 shown in FIG. 4 and the shape, the number and the setting position of the buttons (switches, stick, or the like), etc. are merely one example, and can be changed to other shapes, numbers and setting positions, etc. as needed.

Furthermore, the controller 14 is powered by a battery (not illustrated) detachably housed in the first controller 34. The second controller 36 is supplied with the power through the connector 34*a*, the connector 36*b*, and the cable 36*a*.

FIG. 5 shows an example non-limiting electric configuration of the controller 14 when the first controller 34 and the second controller 36 are connected with each other. The first controller 34 contains a communication unit 98, and the communication unit 98 is connected with the operating portion 82, the acceleration sensor 86, the imaged information arithmetic section 88 and the connector 34*a*. The operating portion 82 indicates the above-described operation buttons or operating switches 82*a*-82*i*. When the operating portion 82 is operated, an operation signal (key information) is applied to the communication unit 98. The data indicative of acceleration detected by the acceleration sensor 86 is output to the communication unit 98. The acceleration sensor 86 has in the order of a maximum sampling period of 200 frames per second. Here, the frame is a screen updating rate (1/60 sec.).

The data taken in by the imaged information arithmetic section 88 is also output to the communication unit 98. The imaged information arithmetic section 88 is constituted by an infrared filter 100, a lens 102, an imager 104 and an image processing circuit 106. The infrared filter 100 passes only infrared rays from the light incident from the light incident opening 90 at the front of the first controller 34. As described above, the markers 44*m* and 44*n* of the sensor bar 44 placed near (around) the display screen of the monitor 30 are infrared LEDs for outputting infrared lights forward the monitor 30. Accordingly, by providing the infrared filter 100, it is possible to image the image of the markers 44*m* and 44*n* more accurately. The lens 102 condenses the infrared rays passing thorough the infrared filter 100 to emit them to the imager 104. The imager 104 is a solid imager, such as a CMOS sensor and a CCD, for example, and images the infrared rays condensed by the lens 102. Accordingly, the imager 104 images only the infrared rays passing through the infrared filter 100 to generate image data. Hereafter, the image imaged by the imager 104 is called an "imaged image". The image data generated by the imager 104 is processed by the image processing circuit 106. The image processing circuit 106 calculates positions of objects to be imaged (markers 44*m* and 44*n*) within the imaged image, and outputs marker coordinates data including each coordinate value indicative of the position to the communication unit 98 for each predetermined time (one frame, for example). It should be noted that a description of the image processing circuit 106 is made later.

The connector 34*a* is connected with the connector 36*b* of the cable 36*a* extending from the second controller 36. The connector 36*b* is connected with the operating portion 94 and the acceleration sensor 96 of the second controller 36. The operating portion 94 denotes the above-described analog joystick 94*a* and operation buttons 94*b* and 94*c*. When the operating portion 94 is operated, an operation signal is applied to the communication unit 98 via the cable 36*a*, the connector 36*b*, the connector 34*a*, etc. The acceleration sensor 96 also has a sampling period similar to that of the acceleration sensor 86, and applies the data indicative of the detected acceleration to the communication unit 98.

The communication unit 98 includes a microcomputer (micon) 108, a memory 110, a wireless module 78 and an antenna 112. The micon 108 transmits the obtained data to the game apparatus 12 and receives data from the game apparatus 12 by controlling the wireless module 78 while using the memory 110 as a memory area (working area and buffer area) in processing.

The data output from the operating portion 82, the acceleration sensor 86 and the imaged information arithmetic section 88 of the first controller 34, and the operating portion 94 and the acceleration sensor 96 of the second controller 36 to the micon 108 is temporarily stored in the memory 110. The wireless transmission from the communication unit 98 to the Bluetooth communication unit 76 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 108 outputs data including the operation data of the operating portions 82 and 94 and the acceleration data of the acceleration sensors 86 and 96, and the marker coordinates data from the imaged information arithmetic section 88 stored in the memory 110 to the wireless module 78 as controller data when transmission timing to the game apparatus 12 has come. The wireless module 78 modulates a carrier of a predetermined frequency by the controller data, and emits its weak radio wave signal from the antenna 112 by using a short-range wireless communication technique, such as Bluetooth. Namely, the controller data is modulated to the weak radio wave signal by the wireless module 78 and transmitted from the first controller 34. The weak radio wave signal is received by the Bluetooth communication unit 76 of the game apparatus 12. The weak radio wave thus received is subjected to demodulating and decoding processing, thus making it possible for the game apparatus 12 to obtain the controller data. The CPU 46 of the game apparatus 12 performs the game processing on the basis of the controller data obtained from the controller 14.

It will be appreciated by those skilled in the art from the description of this specification that a computer, such as a processor (CPU 46, for example) of the game apparatus 12 or the processor (micon 108, for example) of the controller 14 executes processing on the basis of an acceleration signal output from the acceleration sensors 86 and 96 to thereby estimate or calculate (determine) more information relating to the controller 14. In a case that processing is executed on the side of the computer assuming that the first controller 34 and second controller 36 respectively incorporated with the acceleration sensors 86 and 96 are in a static state (that is, processing is executed considering that accelerations detected by the acceleration sensors 86 and 96 are only gravitational accelerations), if the first controller 34 and the second controller 36 are actually in a static state, it is possible to know whether or not the orientations of the first controller 34 and the second controller 36 are inclined with respect to the direction of gravity or to what extent they are inclined on the basis of the detected acceleration. More specifically, when a state in which the detection axes of the acceleration sensors 86 and 96 are directed to a vertically downward direction is taken as a reference, merely whether or not 1G (gravitational acceleration) is imposed on can show whether or not each of the first controller 34 and the second controller 36 is inclined, and the size can show to what extent each of them is inclined. Furthermore, if a multi-axes acceleration sensor is applied, by further performing processing on an acceleration signal of each axis, it is possible to more precisely know to what extent the first controller 34 and the second controller 36 are inclined with respect to the direction of gravity. In this case, on the basis of outputs from the acceleration sensors 86 and 96, the computer may perform processing of calculating data of inclined angles of the first controller 34 and second controller 36, but perform processing of estimating an approximate inclination on the basis of the outputs from the acceleration sensors 86 and 96 without performing the processing of calculating the data of the inclined angle. Thus, by using the acceleration sensors 86 and 96 in conjunction with the computer, it is possible to determine an inclination, an orientation or a position of each of the first controller 34 and second controller 36.

On the other hand, assuming that the acceleration sensors 86 and 96 are in a dynamic state, accelerations according to the movement of the acceleration sensors 86 and 96 are detected in addition to the gravitational acceleration component, and therefore, if the gravitational acceleration component is removed by predetermined processing, it is possible to know a moving direction, etc. More specifically, in a case that the first controller 34 and the second controller 36 respectively being furnished with the acceleration sensors 86 and 96 are accelerated and moved by the hands of the user, acceleration signals generated by the acceleration sensors 86 and 96 are processed by the above-described computer, and whereby, it is possible to calculate various movements and/or positions of the first controller 34 and the second controller 36. Additionally, even when assuming that the acceleration sensors 86 and 96 are in a dynamic state, if an acceleration in correspondence with the movement of each of the acceleration sensors 86 and 96 is removed by the predetermined processing, it is possible to know the inclination with respect to the direction of gravity. In another embodiment, each of the acceleration sensors 86 and 96 may contain a built-in signal processing apparatus or other kinds of dedicated processing apparatuses for performing desired processing on the acceleration signal output from the incorporated acceleration detecting means before outputting the signal to the micon 108. For example, in a case that the acceleration sensors 86 and 96 are ones for detecting a static acceleration (gravitational acceleration, for example), the built-in or dedicated processing apparatuses may be ones for transforming the detected acceleration signal into the inclined angle (or other parameters) corresponding thereto.

Figure 6:
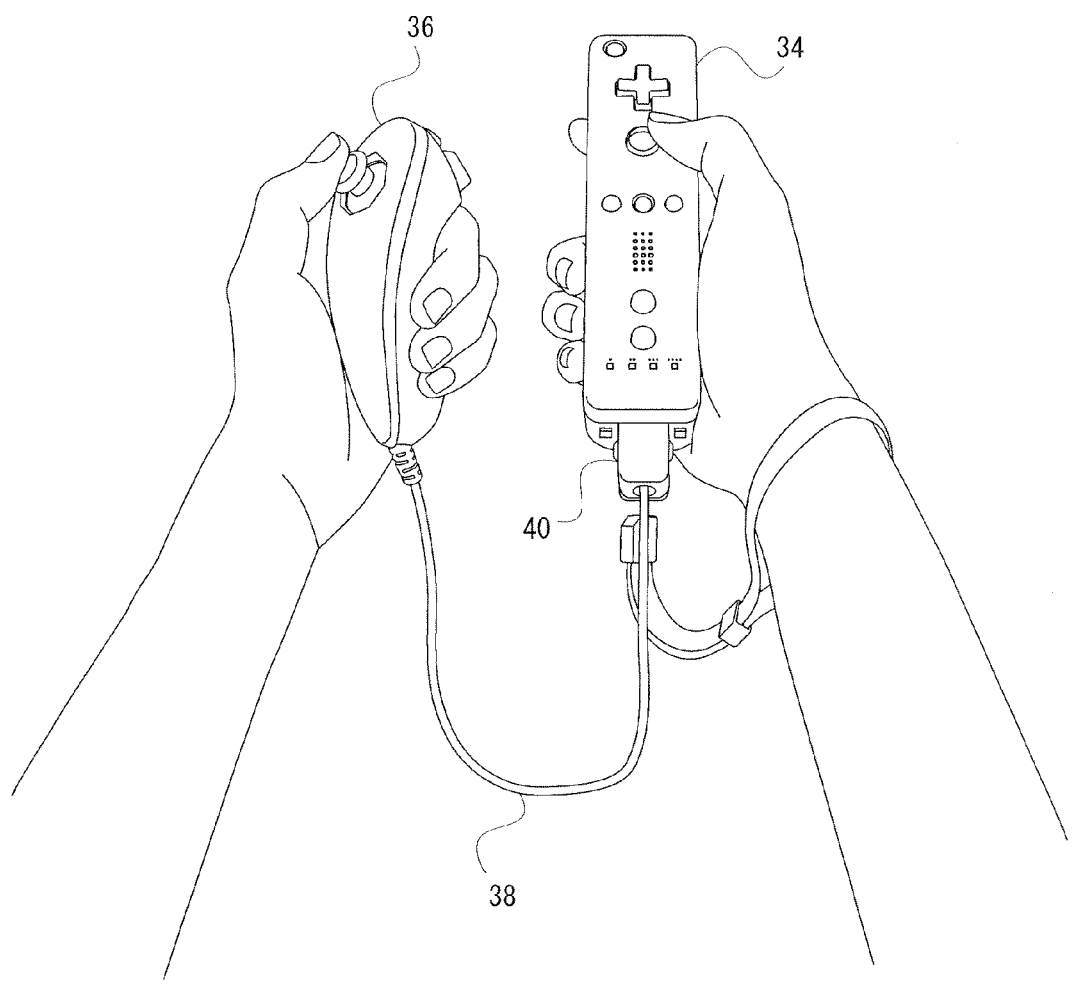
FIG. 6 shows an example non-limiting a situation when a virtual game is played by using the controllers.

In this game system 10, a user can make an operation or input to the game by moving the controller 14. In playing the game, the user holds the first controller 34 with the right hand and the second controller 36 with the left hand as shown in FIG. 6. As described above, in this embodiment, the first controller 34 contains the acceleration sensor 86 for detecting accelerations in the three-axis directions, and the second controller 36 also contains the same acceleration sensor 96. When the first controller 34 and the second controller 36 are moved by the user, acceleration values respectively indicating the movements of the controllers are detected by the acceleration sensor 86 and the acceleration sensor 96. In the game apparatus 12, game processing can be executed according to the detected acceleration values.

Furthermore, the first controller 34 is provided with the imaged information arithmetic section 88, and this makes it possible for the user to utilize the first controller 34 as a pointing device. In this case, the user holds the first controller 34 with the edge surface (light incident opening 90) of the first controller 34 directed to the markers 44m and 44n. It should be noted that as understood from FIG. 1, the markers 44m and 44n are placed around a predetermined side (top or bottom) of the monitor 30 in parallel with the predetermined side. In this state, the user can perform a game operation by changing a position on the screen designated by the first controller 34 by moving the first controller 34 itself, and by changing distances between the first controller 34 and each of the markers 44m and 44n.

Figure 7:
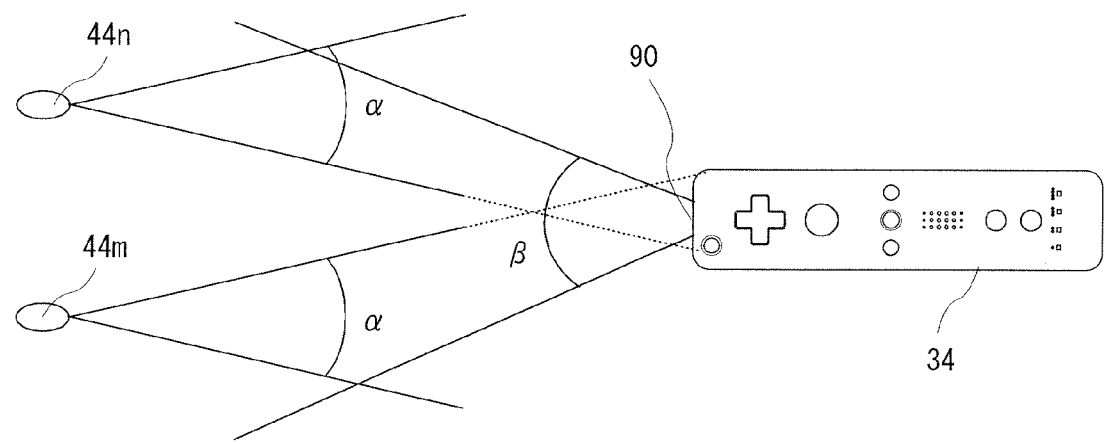
FIG. 7 shows an example non-limiting markers and viewing angles of the controller.

FIG. 7 shows an example non-limiting viewing angles between the respective markers 44m and 44n, and the first controller 34. As shown in FIG. 7, each of the markers 44m and 44n emits infrared ray within a range of a viewing angle α. Also, the imager 104 of the imaged information arithmetic section 88 can receive incident light within the range of the viewing angle β taking the line of sight of the first controller 34 (Z axis direction in FIG. 3) as a center. For example, the viewing angle α of each of the markers 44m and 44n is 34° (half-value angle) while the viewing angle β of the imager 104 is 42°. The user holds the first controller 34 such that the imager 104 is directed and positioned so as to receive the infrared rays from the markers 44m and 44n. More specifically, the user holds the first controller 34 such that at least one of the markers 44m and 44n exists in the viewing angle β of the imager 104, and the first controller 34 exists in at least one of the viewing angles α of the marker 44m or 44n. In this state, the first controller 34 can detect at least one of the markers 44m and 44n. The user can perform a game operation by changing the position and the orientation of the first controller 34 in the range satisfying the state. Also, in a case that any one of the makers 44m and 44n is only detected, by setting temporary marker coordinates in place of the other marker which is not detected by means of data obtained by detecting the previous two makers 44m and 44n, a designated position by the first controller 34 can be calculated.

If the position and the orientation of the first controller 34 are out of the range, the game operation based on the position and the orientation of the first controller 34 cannot be performed. Hereafter, the above-described range is called an "operable range."

Figure 8:
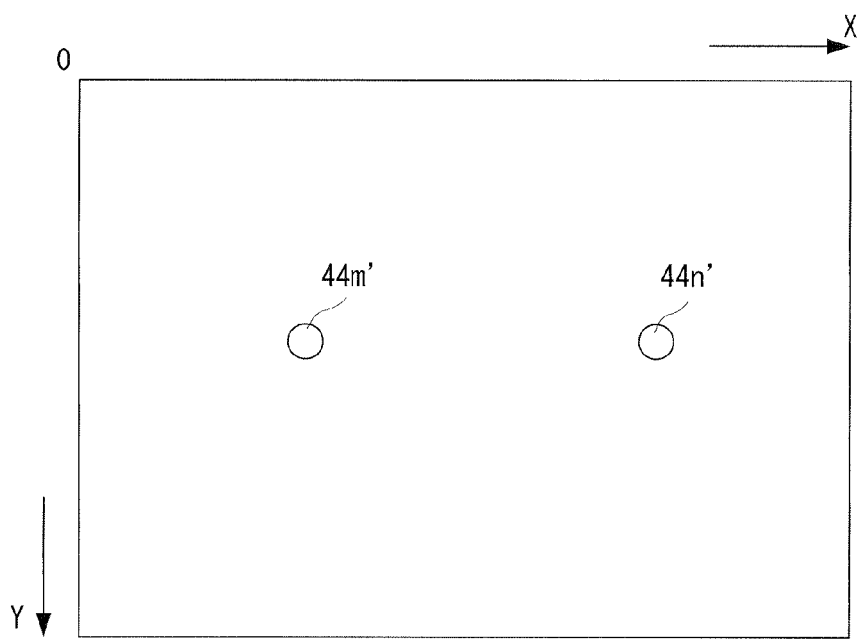
FIG. 8 shows an example non-limiting imaged images of the controller.

If the first controller 34 is held within the operable range, an image of each of the markers 44m and 44n is imaged by the imaged information arithmetic section 88. That is, the imaged image obtained by the imager 104 includes an image (object image) of each of the markers 44m and 44n as an object to be imaged. FIG. 8 shows an example non-limiting imaged image including object images. The image processing circuit 106 calculates coordinates (marker coordinates) indicative of the position of each of the markers 44m and 44n in the imaged image by utilizing the image data of the imaged image including the object images 44m' and 44n'.

Because the object images 44m' and 44n' appear as high-intensity parts in the image data of the imaged image, the image processing circuit 106 first detects the high-intensity parts as a candidate of the object images. Next, the image processing circuit 106 determines whether or not each of the high-intensity parts is an object image on the basis of the size of the detected high-intensity part. The imaged image may include images other than the object image due to sunlight through a window and light of a fluorescent lamp in the room as well as the two object images 44*m*' and 44*n*' (marker images). The determination processing whether or not the high-intensity part is an object image is executed for discriminating the images 44*m*' and 44*n*' of the two markers 44*m* and 44*n* as object images from the images other than them, and accurately detecting the object images. In order to discriminate the object images 44*m*' and 44*n*' in the imaged image from other images, the imaging objects 44*m* and 44*n* are necessary to be known, and in this embodiment, the size is decided in advance, and therefore, it is possible to estimate the size of the marker images 44*m*' and 44*n*'. Thus, on the basis of the size of the high-intensity part, it is possible to make a determination of the marker images 44*m*' and 44*n*'. More specifically, in the determination processing, it is determined whether or not each of the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 106 calculates the position of the high-intensity part. More specifically, the barycenter position of the high-intensity part is calculated. Here, the coordinates of the barycenter position is called "marker coordinates". Also, the barycenter position can be calculated with more detailed scale than the resolution of the imager 104. Now, the resolution of the imaged image imaged by the imager 104 shall be 126×96, and the barycenter position shall be calculated with the scale of 1024×768. That is, the marker coordinates is represented by the integer from (0, 0) to (1024, 768).

Additionally, as shown in FIG. 8, the position in the imaged image is represented in a coordinate system (X-Y coordinate system of the imaged image) by taking the upper left of the imaged image as an original point O, the downward direction as the Y-axis positive direction, and the right direction as the X-axis positive direction.

Furthermore, in a case that the object images 44*m*' and 44*n*' are accurately detected, two high-intensity parts are determined as object images by the determination processing, and therefore, it is possible to calculate two marker coordinates. The image processing circuit 106 outputs data indicative of the calculated two marker coordinates, that is, imaging object data indicative of positions of the imaging objects to the communication unit 98. The output imaging object data (marker coordinate data) is included in the controller data by the micon 108 as described above, and transmitted to the game apparatus 12.

When taking in the marker coordinate data from the received controller data, the game apparatus 12 (CPU 46) can calculate a designated position (designated coordinates) of the first controller 34 on the screen of the monitor 30 and the distance from the first controller 34 to each of the markers 44*m* and 44*n* on the basis of the marker coordinate data. For example, when the first controller 34 designates the left end of the monitor 30, the object images 44*m*' and 44*n*' are detected at the right of the imaged image, and when the first controller 34 designates the lower end of the screen, the object images 44*m*' and 44*n*' are detected at the upper portion of the imaged image. In other words, the marker coordinates on the imaged image are detected at positions reverse to the designated position of the first controller 34 on the screen. Accordingly, when the coordinates of the designated position of the first controller 34 are calculated from the marker coordinates, the coordinate system is appropriately transformed from the coordinate system of the imaged image in FIG. 8 to a coordinate system for representing positions on the screen.

Additionally, in this embodiment, the first controller 34 performs predetermined arithmetic processing on the imaged data to detect the marker coordinates, and transmit the marker coordinate data to the game apparatus 12. However, in another embodiment, imaged data is transmitted as controller data from the first controller 34 to the game apparatus 12, and the CPU 46 of the game apparatus 12 may perform predetermined arithmetic processing on the imaged data to detect the marker coordinates and the coordinates of the designated position.

Furthermore, the distance between the object images in the imaged image is changed depending on the distance between the first controller 34 and each of the markers 44*m* and 44*n*. Because the distance between the markers 44*m* and 44*n*, the width of the imaged image, and the viewing angle β of the imager 104 are decided in advance, by calculating the distance between the two marker coordinates, the game apparatus 12 can calculate the current distance between the first controller 34, and each of the markers 44*m* and 44*n*.

In the game system 10 configured as described above, a game program is executed by the game apparatus 12 to thereby play a corresponding virtual game (rhythm game in this embodiment). When the rhythm game is started, displayed on the monitor 28 is a menu screen (not illustrated) from which each player selects a player object to be used and one BGM to be reproduced (played).

The rhythm game is a virtual game to be played by four players (4P) in cooperation with one another, and if the number of players is less than four, the computer (CPU 40) is in charge of an insufficient player. That is, in a case that three players exist, the computer is in charge of one player, in a case that two players exist, the computer is in charge of two players, and in a case that one player exists, the computer is in charge of three players.

Figure 9:
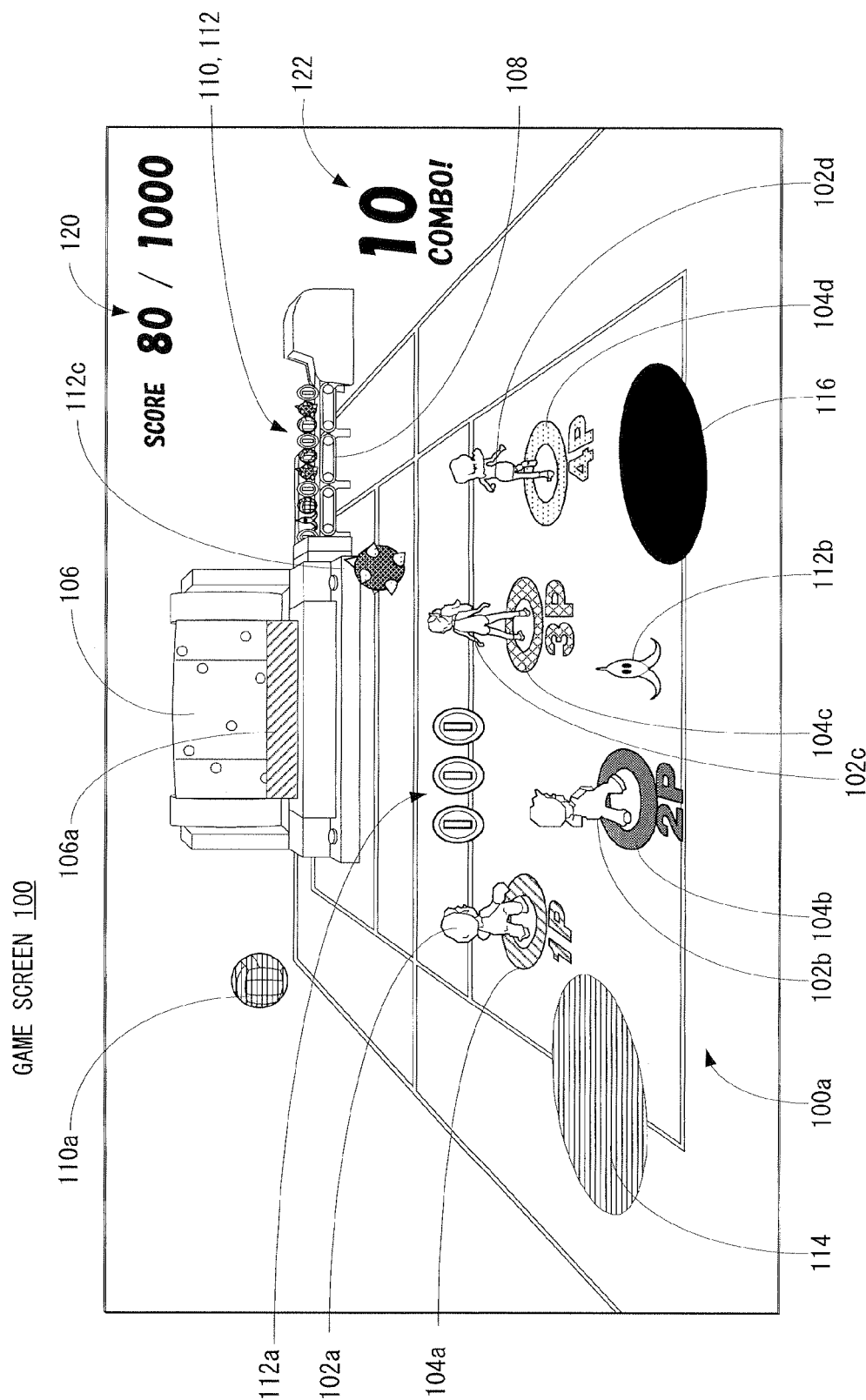
FIG. 9 shows an example non-limiting game screen to be displayed on the monitor of FIG. 1.

After selection of the player object and the BGM is ended, reproduction of the BGM is started. Then, a game screen 100 as shown in FIG. 9 is displayed on the monitor 28. As shown in FIG. 9, on the game screen 100, a game field 100*a* is displayed, and within the game field 100*a*, a first player (1P) object 102*a*, a second player (2P) object 102*b*, a third player (3P) object 102*c* and a fourth player (4P) object 102*d* are displayed. Here, the game field 100*a* is provided within the virtual game space.

Furthermore, as to the player objects 102*a*-102*d*, ring-shaped designation images 104*a*-104*d* are displayed so as to enclose the foot thereof, and identified by letters of 1P-4P. Although it is difficult to understand in the drawing, the designation images 104*a*-104*d* respectively correspond to the letters of 1P-4P, and each pair of them are colored in the same color to show a color assigned to each of the player objects 102*a*-102*d*. For example, the 1P is assigned a blue, the 2P is assigned a red, the 3P is assigned a green, and the 4P is assigned a yellow. Here, this is cited merely by way of example, and without limitation. Also, because it is impossible to apply colors to the drawing, patterns are applied to the designation images 104*a*-104*d*, the letters of 1P-4P and a color ball object 110*a* described later. Accordingly, the same in pattern means the same in color.

Figures 11, 12:
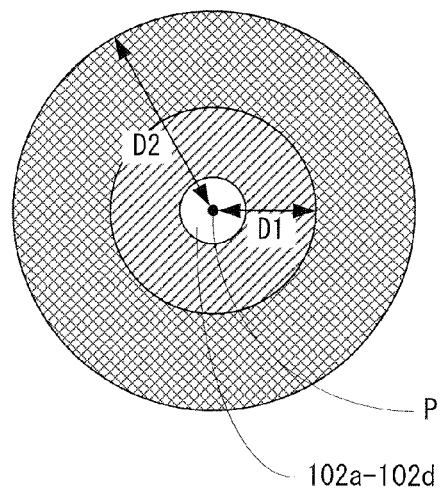
FIG. 11 shows an example non-limiting range in which it is determined that a player object catches or receives a ball object.
FIG. 12 shows an example non-limiting a BGM change table.

In addition, within the game field 100*a*, a shooting platform object 106 is displayed, and at the right thereof, a conveyor belt object 108 is displayed to be connected. As shown in FIG. 12, on the conveyor belt object 108, ball objects 110 and item objects 112 to be conveyed to the shooting platform object 106 are placed. The ball object 110 and the item object 112 are shot from the shooting platform object 106 according to the reproduction of the BGM at predetermined timing (shoot timing).

Although it is difficult to understand in FIG. 9, the ball objects 110 and the item objects 112 are arranged in the order of their being shot (from the left end in order) on the conveyor belt object 108. In this embodiment, each of the ball object 110 and the item object 112 is arranged at the tail end (right end) of the conveyor belt object 108 predetermined time (2 sec. in this embodiment) before the shoot timing, and moved gradually leftward along the conveyor belt object 108 toward the shooting platform object 106. Then, as described above, at the shoot timing, each of the ball object 110 and the item object 112 is shot from a shoot opening 106*a* of the shooting platform object 106.

Here, a description is made on the ball object 110 and the item object 112. FIG. 10(A)-FIG. 10(C) shows an example non-limiting part of the conveyor belt object 108 and examples of the ball object 110 and the item object 112 to be arranged thereon at an arbitrary timing during playing the virtual game. As shown in FIG. 10(A)-FIG. 10(C), the ball object 110 is an object imitating a valley ball, and includes a color ball object 110*a* to which any one of the fours colors assigned to the player objects 102*a*-102*d* is applied and a rainbow ball object 110*b* to which the four colors are applied.

Here, in FIG. 10(A) and FIG. 10(C) (this holds true for FIG. 9), the rainbow ball object 110*b* is shown by a white for simplicity.

Furthermore, as shown in FIG. 10(A)-FIG. 10(C), the item object 112 includes a coin object 112*a*, a banana object 112*b*, and an iron ball object 112*c*.

Returning to FIG. 9, the ball object 110 is shot according to the reproduction of the BGM, and flies through the game field 100*a*. When any one of the player objects 102*a*-102*d* catches or receives the ball object 110, this situation is displayed, and then the ball object 110 is erased from the game field 100*a*. However, in a case that any one of the player objects 102*a*-102*d* does not catch or receive the ball object 110, when the ball object 110 drops on a ground, it bounces once or twice in a progress direction for a predetermined time (two sec., for example) and erased from the game field 100*a*.

Also, the coin object 112*a*, the banana object 112*b* and the iron ball object 112*c* are shot from the shooting platform object 106 according to the reproduction of the BGM similar to the ball object 110, and flies through the game field 100*a*. When the coin object 112*a* drops on the ground, it remains for a predetermined time (3 sec., for example), and then erased from the game field 100*a*. Alternatively, when the banana object 112*b* drops on the ground, it remains for a predetermined time (4 sec., for example), and is erased from the game field 100*a*. In addition, when the iron ball object 112*c* drops on the ground, it bounces once or twice in a progress direction for a predetermined time (two sec., for example) and erased from the game field 100*a*.

In addition, on the game screen 100, a display region 120 for displaying a score is provided at an upper right of the screen, and at the left of "/", a current score is indicated, and at the right of "/", a norm for clearing this virtual game is indicated. Moreover, on the game screen 100, a display region 122 for displaying the number of consecutive catches or receptions (COMBO) is provided at the right of the screen below the display region 120.

As described above, when the ball object 110 is shot, an index (impact marker) 114 indicating a predetermined range including the point of impact (circle about the point of impact with a radius of a predetermined length) is displayed. Although it is difficult in the drawing, the impact marker 114 is applied the same color as the color applied to the corresponding color ball object 110*a* or the rainbow ball object 110*b*. Accordingly, the player can know the impact point of the ball object 110 to be caught or received while viewing the color of the impact marker 114.

Furthermore, when the banana object 112*b* or the iron ball object 112*c* of the item objects 112 are shot, a black impact marker 116 indicating a predetermined range including the point of impact (circle about the point of impact with a radius of a predetermined length) is displayed. In this embodiment, in response to the banana object 112*b* and the iron ball object 112*c*, the black impact marker 116 is displayed, but another color may be applied if it may be discriminated from the color applied to the player objects 102*a*-102*d* and the ball object 110. It should be noted that on the game screen 100 shown in FIG. 9, the banana object 112*b* has already dropped on the ground, and thus, the impact marker 116 is not displayed (erased).

According to an operation by each player, each of the player objects 102*a*-102*d* moves in the game field 100*a*, catches or receives the ball object 110, obtains the coin object 112*a*, and avoids the banana object 112*b* or the iron ball object 112*c*. Each player holds the first controller 34 and the second controller 36 as shown in FIG. 6. Accordingly, although omitted in FIG. 1, the first controller 34 and the second controller 36 are provided by the number corresponding to the number of players (up to 4 in this embodiment).

Each player operates the analog joystick 94*a* of the second controller 36 held by the left hand to thereby move the corresponding one of the player objects 102*a*-102*d* in a direction (left, right, top, bottom and oblique directions) in which the analog joystick 94*a* is inclined. Accordingly, when the ball object 110*a* arrives at the fall point (point of impact), in a case that the point of impact of the ball object 110*a* is within a predetermined range (hereinafter, referred to as "first predetermined range") in a horizontal direction taking any one of the player objects 102*a*-102*d* as a center, the corresponding player object 102*a*-102*d* catches the ball object 110. The first predetermined range is the same size as the above-described impact marker 114, and thus, if each object 102*a*-102*d* exists on the impact marker 114, it can catch the ball object 110. Here, determination as to whether to catch or not only based on the time (timing) of arriving at the point of impact results in determination for extremely short time (one frame), thus, resulting in inability of catching in most cases. Thus, in this embodiment, the determination as to whether to catch or not (this holds true for a rolling catch described later) is made based on a predetermined period (period from five frames before the ball object 110 falls to when it drops).

Furthermore, the player swings the first controller 34 held with the right hand (left, right, top, bottom and oblique directions) to make the corresponding player object 102*a*-102*d* jump, and perform a rolling catch toward the point of impact of the ball object 110 as a target which is decided according to a predetermined rule. Although the detailed description is omitted, the rolling catch allows the player object 102a-102d to move faster than when it is moved with the analog joystick 94a along the same distance.

Here, the predetermined rule is a rule for deciding the ball object 110 for which the player object 102a-102d targets. More specifically, in a case that the corresponding color ball object 110a exists in a receivable range, the player object 102a-102d sets the color ball object 110a as a target. Here, the receivable range is a range decided by a maximum distance allowing the player object 102a-102d to catch the ball object 110 by rolling, and is a predetermined range in the horizontal direction taking the player object 102a-102d (hereinafter, referred to as "second predetermined range") as a center, and set to be a value larger than the first predetermined range. Furthermore, in a case that a plurality of corresponding color ball objects 110a exist within the receivable range, the player objects 102a-102d sets the color ball object 110a which arrives first as a target. In addition, in a case that the corresponding color ball object 110a does not exist in the receivable range, the player object 102a-102d sets the nearest ball object 110 as a target.

That is, as shown in FIG. 11, each player object 102a-102d has the first predetermined range (radius D1) for catching the ball object 110 and the second predetermined range (radius D2>radius D1) for catching the ball object 110 by rolling. Here, FIG. 11 shows an example non-limiting any one of the player objects 102a-102d as seen from above. Thus, in a case that it is determined whether or not each player object 102a-102d catches or receives the ball object 110, the determination is made for each case.

For example, in a case that the player does not swing the first controller 34, it is determined whether or not each player object 102a-102d catches the ball object 110. More specifically, it is determined whether or not the point of impact of the ball object 110 is set within the first predetermined range defined by the radius D1 from the position P of each player object 102a-102d (current position). In a case that the point of impact of the ball object 110 is set within the first predetermined range, it is determined that the ball object 110 is caught.

On the other hand, in a case that the player swings the first controller 34, it is determined whether or not each player object 102a-102d catches the ball object 110 by rolling. More specifically, it is determined whether or not the point of impact of the ball object 110 is set within the second predetermined range defined by the radius D2 from the position. P of each player object 102a-102d (current position). In a case that the point of impact of the ball object 110 is set within the second predetermined range, it is determined that the ball object 110 is caught by rolling.

Here, in this embodiment, in view of operability, by using the analog joystick 94a of the second controller 36, the movement (walking or running) of each player object 102a-102d is controlled, and by swinging the first controller 34, each player object 102a-102d performs a rolling catch, but it is not limited thereto. For example, in a case that only the first controller 34 is used with it horizontally held, by using the cross key 82a, the movement of each player object 102a-102d is controlled, and by using the 2 button 82c, each player object 102a-102d may perform a rolling catch.

Furthermore, in this embodiment, by swinging the first controller 34, each player object 102a-102d performs a rolling catch, but it may simply run fast, extend a part of the body, or use a flying tool. Here, in a case of using the flying tool, on the basis of the fact that the flying tool hits the ball object 110 in the virtual game, it is determined that receiving is performed.

In addition, each ball object 110 is assigned a predetermined melody, and when each player object 102a-102d catches or receives the ball object 110, the melody is reproduced in addition to the BGM. That is, the predetermined melody is output as a sound effect showing that catching or receiving the ball object 110 is successful. In this embodiment, the melody is a tune (tune of a musical instrument which is not used in the BGM) of a main theme one BGM of a predetermined length (in the order of 0.15 sec.-0.25 sec.). Here, in a case that each player object 102a-102d catches or receives the color ball object 110a to which the same color as that assigned to its own is applied, the melody assigned to the color ball object 110a is reproduced in a correct pitch. At this time, 10 points, for example, are gained and added to the score.

Furthermore, with respect to the rainbow ball object 110b, even if any player object 102a-102d catches or receives it, the melody assigned to the rainbow ball object 110b is reproduced in a correct pitch. At this time, 50 points, for example, are gained and added to the score.

On the other hand, in a case that each player object 102a-102d catches or receives the color ball object 110a to which a different color is applied, the melody assigned to the color ball object 110a is reproduced in a different pitch. In this case also, 10 points, for example, are gained and added to the score. Here, in a case that any player object 102a-102d operated by the computer catches or receives the color ball object 110 to which the same color as that assigned to the player object 102a-102d operated by the player, no point is added.

Or, in a case that the ball object 110 falls on to the ground without being caught or received by any player object 102a-102d, the melody assigned to the ball object 110 is not reproduced. In this case, a sound effect (dissonance, for example) representing failure is reproduced, and 10 points, for example, are deducted, and subtracted from the score. Also, when the player object 102 touches the item object 112 (coin object 112a, banana object 112b and iron ball object 112c) which flies through the air, remains on the ground or bounces up and down on the ground, it earns points, loses points, or is given a predetermined effect. In this embodiment, when each player object 102 touches the coin object 112a, 10 points assigned to the coin object 112a are added to the score. Furthermore, when each player object 102a-102d touches the banana object 112b, the player object 102a-102d slipped by it and is immovable for a predetermined time (2 sec., for example). For example, a scene in which the player object 102a-102d touches the banana object 112b, then is slipped and immovable due to being damaged is displayed by animation. In addition, when each player object 102a-102d touches the iron ball object 112c, the player object 102a-102d is damaged by it and subtracted by 50 points. Additionally, when each player object 102a-102d touches (hits) the iron ball object 112c, it is determined that catching or receiving is performed by mistake, and the number of consecutive catches is 0 (reset). For example, a scene in which the player object 102a-102d touches the iron ball object 112c and is then damaged is displayed by animation.

Here, the above-described item object 112 is merely one example, and other kinds of item objects 112 are prepared, by which some points may be added or subtracted, or a predetermined advantage may be given to the player object 102a-102d. For example, in a case that a jewel object is obtained, bonus points may be added. Also, each player object 102a-102d may be blown off by a blast of a bomb object. At this time, points may further be subtracted. In addition, when a food object such as a mushroom is obtained, each player object 102a-102d may be changed in size (large or small) only for a predetermined time, be increased in a moving velocity, or be made invincible independent of an influence of obstacle items, such as the banana object 112b, the iron ball object 112c, etc.

Furthermore, when each player object 102a-102d consecutively catches or receives the ball object 110, the number of consecutive catches is counted. Here, in a case that the player object 102a-102d operated by the computer (hereinafter, sometimes referred to as a "computer player") receives the color ball object 110a of a color different from that assigned to the own, the number of consecutive catches is not added. Also, if each player object 102a-102d does not catch or receive the ball object 110, that is, fails to catch or receive it, the number of consecutive catches is reset. In this embodiment, in a case that the number of catches or receptions is increased, the BGM is changed to increase the splendor in accordance with the number of consecutive catches. On the other hand, in a case that each player object 102a-102d fails to catch or receive, the BGM is sharply changed to reduce the splendor. That is, in accordance with the result of the game play, at least one of the number of tracks (parts) and a volume of the BGM is changed in this embodiment.

Each BGM is made up of a plurality of parts. Although illustration is omitted, data of BGM (BGM data) is made up of a plurality of track data (six, in this embodiment), and each track data is made up of musical score data as to one or a plurality of parts. Out of the plurality of track data making up of the BGM data, basic four pieces of track data corresponds to a part (track) of which each player is in charge (plays). In this embodiment, the degree of splendor of each BGM (degree of splendor) is changed among four levels "minimum", "normal", "great", and "excellent". More specifically, according to a BGM change table shown in FIG. 12, the degree of splendor is changed.

Here, each BGM is made up of a BGM 1 as a base, and a BGM 2 and a BGM 3 to be reproduced additionally. The BGM 1 is made up of the four tracks as a base out of the six tracks belonging to the BGM. The BGM 2 is made up of the one track out of the two tracks exclusive of the four tracks as a base from the 6 tracks, and the BGM 3 is made up of the rest of the one track.

According to the change table shown in FIG. 12, in a case that the degree of splendor is "normal", the BGM 1 is reproduced at a 100% volume. Alternatively, in a case that the degree of splendor is "great", the BGM 2 is reproduced at a 100% volume in addition to the BGM 1 reproduced at a 100% volume. Still alternatively, in a case that the degree of splendor is "excellent", the BGM 3 is reproduced at a 100% volume in addition to the BGM 1 and the BGM 2 which are reproduced at a 100% volume. Here, in a case that the degree of splendor is "minimum", the BGM 1 is reproduced at a 33% volume.

Although detailed description is omitted, the volumes described here are not volumes set in the color television receiver, but volumes set inside the game apparatus 12. For example, the level of the audio data output from the DSP 52 is adjusted. Or, the level of the analog sound signal corresponding to the audio data is adjusted by the AV IC 56, and output to the speaker 30.

Here, in this embodiment, in a case the degree of splendor is "great" or "normal", when it changes to "minimum", both of the number of tracks (parts) and the volume may be changed, such as decrease in the number of tracks (parts) (change from the BGM 1+the BGM 2 to the BGM 1), and reduction in volume (reduction from 100% to 33%). However, in a case that the degree of splendor changes from "normal" to "great", or changes from "great" to "excellent", the BGM 2 and the BGM 3 are merely additionally reproduced. That is, the number of tracks (parts) is increased, and the volume is not changed. Accordingly, in this case also, the volume may be changed. For example, it is conceivable that the volume of the BGM 1 in a case that the degree of splendor is "normal" is set to 70%, and the volume of the BGM 2 in a case that the degree of splendor is "great" is set to 50%-70%.

Furthermore, in this embodiment, alignment information as shown in FIG. 13 (A) is provided in correspondence to the BGM. Although illustration is omitted, the alignment information is provided for each of the plurality of BGMs. The alignment information includes information (object information) as to a timing when a melody set along with the BGM is reproduced, kinds of the ball object 110 to which the melody is assigned and kinds of the item object 112 to which the melody is not assigned, and a movement control.

As shown in FIG. 13(A), the alignment information includes four tracks (track 0, track 1, track 2, track 3). To each track, a plurality of cells are provided in chronological order from the start of reproducing the BGM (0 frame) to the end thereof. The object information can be set to each cell. Thus, at a timing when a melody is played, the object information as to the ball object 110 is described. Also, at a timing when an item is arranged, the object information as to the item object 112 is described. In FIG. 13(A), the cell to which the object information is described is diagonally shaded, and to the blank cell, no object information is described.

As described above, the object information is set to the cell, and thus, the length of one cell corresponds to the length of a melody. In this embodiment, in accordance with a playing velocity of the BGM, the length of a melody is set to a predetermined time (0.15 sec. (about 10 to 11 frames) to 0.25 sec. (15 frames)).

FIG. 13(B) shows an example non-limiting object information. The object information includes a reproduction timing frame, a classification, a flying time, a minimum distance, a maximum distance and a special flag. The reproduction timing frame is a frame at a timing when the ball object 110 or the item object 112 arrives at the point of impact, and described by the number of frames from the start of reproducing the BUM (0 frame). Thus, the alignment sequence of the cells shown in FIG. 13(A) corresponds to an order (arrival order) in which the ball object 110 and the item object 112 arrive at the point of impact.

The classification is described by identification information of a melody to be reproduced when the ball object 110 is caught or received in a case of the ball object 110. In this embodiment, the identification information of the melody is an ID or a filename of the corresponding data. On the other hand, in a case of the item object 112, a kind of the items (coin, banana, iron ball) is described as a classification.

The flying time is a time from when the ball object 110 or the item object 112 is shot to when it arrives at the point of impact, and described by the number of frames corresponding to the time. Although detailed description is omitted, the flying time is set by three levels (60 frames, 120 frames, 180 frames).

The minimum distance and the maximum distance are distances for defining a range when the point of impact of the ball object 110 or the item object 112 is decided, and described by a length in the game field 100a, that is, in the virtual game space. Here, the minimum distance and maximum distance are distances from a current position of each player object 102a-102d to which the track including the object information is assigned.

The special flag is a flag for determining whether a rainbow ball object 110b or not, and described by being established (on) or not being established (off). In a case that the special flag is turned on, the rainbow ball object 110b, and in a case that the special flag is turned off, the ball object 110 in color assigned to any one of the player objects 102a-102d to which the track including the object information is assigned. That is, in a case that the special flag is turned on, the rainbow ball object 110b is shot in place of the color ball object 110a.

As described above, the flying time of the ball object 110 and the item object 112 are set in three levels, and thus, the arrival order and the shoot order may be transposed. Also, in this embodiment, the ball objects 110 and the item objects 112 are arranged on the conveyor belt object 108 predetermined time before the shoot timing. Accordingly, in this embodiment, on the basis of the alignment information, a table (shoot timing table) as to the shoot timing is created, and according to this shoot timing table, the shoot of the ball object 110 and item object 112 is controlled.

As shown in FIG. 14, in the shoot timing table, the track number and the arrival order of the alignment information are described in correspondence with the shoot timing frame. The shoot timing table is generated focusing on only the object information included in the alignment information. First, a shoot timing frame is calculated by subtracting a flying time from a reproduction timing frame included in each object information. Then, the track number and the arrival order in which the corresponding object information is described are described in order of earliness of the shooting timing frame.

Here, in FIG. 14, for simplicity, the shooting timing frame is denoted by fn (n=1, 2, . . . , N), but it is actually described by the number of frames from the start of reproducing the BGM. Furthermore, the track number is indicated by T0-T3, and T means a track in the alignment information.

According to this shoot timing table, the ball objects 110 and the item objects 112 are arranged on the conveyor belt object 108, and shot from the shooting platform object 106.

Next, a movement control of the ball object 110 and the item object 112 (hereinafter, sometimes referred to as "object 110, 112") that are to be shot is explained. FIG. 15(A) shows an example non-limiting the game field 110a as seen from above. In a case that each object 110, 112 is shot, an arrival position, that is, a point of impact (point on the two-dimensional plane) is first decided. The point of impact is decided in correspondence with the position (current position) P of the corresponding one of the player objects 102a-102d. Here, the corresponding one of the player objects 102a-102d means each player object 102a-102d to which any one of the track 0-track 3 described by the object information of the object 110, 112 is assigned.

First, by the minimum distance (radius r) and the maximum distance (radius R) described in the object information, a doughnut-shaped range (diagonally shaded range) is defined. Within the doughnut-shaped range, a point of impact B is arbitrarily (randomly) decided. Here, in this embodiment, a shooting position A in a horizontal plane (X-Y plane) shall fixedly be set at the center of the shooting platform object 106. When the point of impact B is decided, a distance d (horizontal distance) between the shooting position A and the point of impact B is calculated. More specifically, this is calculated according to Equation 1. Here, coordinates of the shooting position A in the horizontal plane shall be (X1, Y1), and coordinates of the point of impact B shall be (X2, Y2). Furthermore, as shown in FIG. 15(A), in a world coordinate system, a lateral direction is an X-axis direction, a longitudinal direction is a Y-axis direction, and a height direction is a Z-axis direction. Also, a right direction is a plus direction of the X-axis, a downward direction is a plus direction of the Y-axis, and a direction vertical to a sheet upwardly is a plus direction of the Z-axis.

$$d=\sqrt{\{(X1-X2)^2+(Y1-Y2)^2\}}$$ [Equation 1]

Additionally, an angle $\phi$ in a horizontal direction out of the shoot direction of each object 110, 112 is calculated according to Equation 2. Here, a straight line H extending in parallel with the Y axis so as to pass through the shooting position A shall be the center of the horizontal direction (0 degrees). Furthermore, the symbol of the angle $\phi$ which is formed on the right side of the straight line H as seen from the shooting position A shall be a minus sign, and the symbol of the angle $\phi$ which is formed on the left side of the straight line H shall be a plus sign. In addition, L (=X2−X1) is a length of a perpendicular line drawing down from the point of impact B to the straight line H.

$$\phi=\sin^{-1}(L/d)$$ [Equation 2]

When the distance d is calculated according to Equation 1, the flying time t (frame) is given in the above-described object information, and thus, on the basis of the calculation of physics of projectile motion shown in Equation 3-Equation 5, an angle $\theta$ in the vertical direction of the object 110, 112 is calculated according to Equation 6. In addition, the angle $\theta$ is substituted into Equation 3 to thereby calculate a shoot velocity (initial velocity) v. Here, h is a distance in the height direction (plus direction of Z axis). In this embodiment, as shown in Equation 5, the height h when the object 110, 112 reaches the peak is arbitrarily (randomly) decided when the object 110, 112 is shot. Here, the range of the height h of the peak is decided in advance. In addition, g corresponds to the acceleration (corresponding to the gravitational acceleration) in the minus direction of the Z axis set to the virtual game space.

$$d=v\times\cos\theta\times t$$ [Equation 3]

$$h=v\times\sin\theta\times t-1/2\times gt^2$$ [Equation 4]

$$(v\times\sin\theta)^2=2gh$$ [Equation 5]

After the second term of the right side of Equation 4 is transposed to the left side, and the left side member and the right side member of Equation 4 is respectively divided by the left side member and the right side member of Equation 3 to thereby calculate an angle $\theta$ in the vertical direction as shown in FIG. 6.

$$\frac{v\times\sin\theta\times t}{v\times\cos\theta\times t}=\frac{h+\frac{gt^2}{2}}{d}$$ [Equation 6]

$$\theta=\tan^{-1}\theta\times\sqrt{\frac{h+\frac{gt^2}{2}}{d}}$$

Here, as shown in FIG. 15(B), the shooting position A of the shooting platform object 106 and the point of impact B are identical with the horizontal plane, and set to the positions slightly higher than the ground. This is because that when each of the player objects 102a-102d catches or receives the ball object 110, melody is reproduced. Accordingly, positions (value of the Z axis) of the shooting position A and the point of impact B are set from the waist to the knee of each player object 102a-102d, for example.

Here, in this embodiment, the two distances (minimum distance and maximum distance) are set to the object information, and the point of impact B is arbitrarily decided within the range defined by them, but only one distance is set, and the inside or an arbitrary point on the circle defined by the position of each player object 102a-102d and the distance may be decided as a point of impact B. Thus, in a case that one or two distances are set, it is possible to prevent a disadvantage of the point of impact B being set at a position where the player object 102a-102d cannot catch or receive. Furthermore, the distance is set from the position P of each player object 102a-102d, and therefore, it is possible to easily set the range in which the point of impact B is decided. Here, without setting the distance to the object information, the arbitrary point on the game field 102a may be decided as a point of impact B.

Additionally, in this embodiment, when the objects 110, 112 are shot, the height h of the peak is arbitrarily decided, but instead of this, the angle θ in the vertical direction may randomly be decided within the predetermined range (15 degrees-80 degrees, for example). This makes it possible to easily calculate the initial velocity v according to Equation 3.

Figure 16:
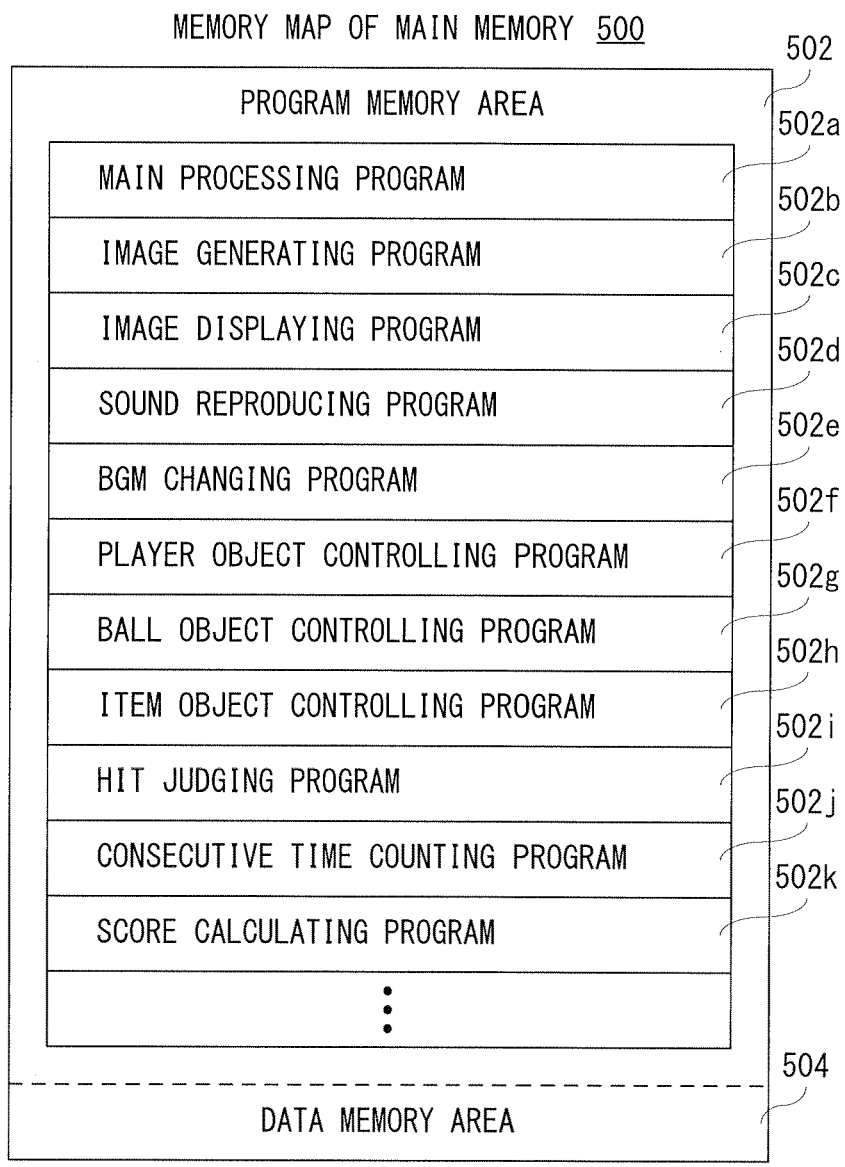
FIG. 16 shows an example non-limiting memory map of a main memory shown in FIG. 2.

FIG. 16 shows an example non-limiting memory map 500 of the main memory 42c (46) shown in FIG. 2. As shown in FIG. 16, the main memory 42c (46) includes a program memory area 502 and a data memory area 504. The program memory area 502 stores a game program, the game program is made up of a main processing program 502a, an image generating program 502b, an image displaying program 502c, a sound reproducing program 502d, a BGM changing program 502e, a player object controlling program 502f, a ball object controlling program 502g, an item object controlling program 502h, a hit judging program 502i, a consecutive time counting program 502j, a score calculating program 502k, etc.

The main processing program 502a is a program for processing a main routine of a virtual game (rhythm game) of this embodiment. The image generating program 502b is a program for generating display image data to display various screens, such as the game screen 100 as shown in FIG. 9 by using image data 504b (see FIG. 17) described later. The image displaying program 502c is a program for outputting display image data generated according to the image generating program 502b to the monitor 28.

The sound reproducing program 502d is a program for generating audio data from BGM data (sound data) as to the BGM by controlling the DSP 52, and outputting it to the speaker 30. Thus, the BGM selected by the player is reproduced. Also, the sound reproducing program 502d is a program for generating audio data of sound (sound effect), voice or music except for the BGM by controlling the DSP 52 with the use of the note data 504e described later, and outputting it to the speaker 30. Accordingly, a melody in a case that the ball object 110 is caught or received is reproduced, or sound effect in a case that the ball object 110 cannot caught or received is reproduced. The BGM changing program 502e is a program for changing at least one of the number of tracks (parts) and volume of the BGM so as to follow the BGM change table as shown in FIG. 12.

The player object controlling program 502f is a program for controlling a movement, etc. of the corresponding player object 102a-102d according to the controller data from the first controller 34 and the second controller 36. The ball object controlling program 502g is a program for controlling a movement, etc. of the ball object 110. The item object controlling program 502h is a program for controlling a movement, etc. of the item object 112 (coin object 112a, banana object 112b, and iron ball object 112c).

The hit judging program 502i determines whether each player object 102a-102d touches (hits) the ball object 110 or determines whether or not it touches (hits) the item object 112. Here, whether or not each player object 102a-102d touches or hits the ball object 110 is determined depending on whether or not the point of impact of the ball object 110 exists within the first predetermined range or within the second predetermined range taking the player object 102a-102d as a center within the predetermined time as described above. Here, as described above, the first predetermined range or the second predetermined range is employed depending on whether or not the first controller 34 is swung.

The consecutive time counting program 502j is a program for counting the number of consecutive times that each player object 102a-102d catches or receives the ball object 110. The score calculating program 502k is a program for adding or subtracting sores according to addition or deduction of points.

Although illustration is omitted, in the program memory area 502, a backup program, etc. is also stored. The backup program is a program for storing (saving) the game data (proceeding data, result data) in the memory card 38.

As shown in FIG. 17, in the data memory area 504, an operation data buffer 504a is provided. The operation data buffer 504a is provided for storing (temporarily storing) controller data from the first controller 34 and the second controller 36. The controller data stored in the operation data buffer 504a is erased after being used in the processing by the CPU 40.

Also, in the data memory area 504, image data 504b, BGM data 504c, alignment data 504d, note data 504e, player information data 504f, track assignment data 504g, shoot data 504h, horizontal angle data 504i, vertical angle data 504j, velocity data 504k and score data 504m are stored.

The image data 504b includes data for generating display image data, such as polygon data, texture data, etc. and animation data for making the player object 102a-102d perform a predetermined motion. The BGM data 504c is data as to a plurality of BGMs (first BGM, second BGM, . . . ). Each of the first BGM data 5040 and the second BGM data 5042, . . . includes track data of six tracks as described above.

The alignment data 504d is data as to a plurality of alignment information (first alignment information, second alignment information, . . . ). Each of the first alignment information data 5050 and second alignment information data 5050, . . . , is data for which a plurality of cells are provided in an arrival order, and in some cells, object information is described for each of the four tracks (track 0, track 1, track 2, track 3) corresponding to the four players (the computer player may be included) as described above. Here, the first alignment information data 5050 corresponds to the first BGM data 5040, and the second alignment information data 5052 corresponds to the second BGM data 5042. That is, the same number of alignment information as the BGM is provided.

The note data 504e is sound data and sound waveform (tone) data as to sound effect including a melody, voice or music except for the BGM, and each data is brought into correspondence with identification information. The player information data 504f is data indicating information (player information) as to each player object 102a-102d selected by each player (1P-4P). For example, with respect to the player information, identification information of the player objects 102a-102d is described by bringing it into correspondence with the 1P-4P, respectively.

The track assignment data 504g is data indicating to which player object 102a-102d each of the four tracks (track 0-track 3) included in the alignment information (5050, 5052, . . . ) corresponding to the selected BGM (5040, 5042, . . . ) is assigned. The shoot data 504h is data as to a shoot timing table created from the alignment information (5050, 5052, . . . ) corresponding to the selected BGM (5040, 5042, . . . ). The horizontal angle data 504i is data as to the angle φ in the horizontal direction calculated according to Equation 2 with respect to each object 110, 112 to be shot. The vertical angle data 504j is data as to the angle θ in the vertical direction calculated according to Equation 6 with respect to each object 110, 112 to be shot. The velocity data 504k is data as to a shoot velocity (initial velocity) v calculated according to Equation 3 and Equation 6 with respect to each object 110, 112 to be shot. The score data 504m is numerical value data as to scores.

In addition, in the data memory area 504, a frame counter 504n, a consecutive catch counter 504p, an immovable timer 504q, a minimum flag 504r, a normal flag 504s, a great flag 504t, an excellent flag 504u, an immovable flag 504v, and a damage flag 504w are provided.

The frame counter 504n is an up counter for counting the number of frames from the start of reproducing the BGM. The consecutive catch counter 504p is an up counter for counting the number of times that each player object 102a-102d consecutively catches or receives the ball object 110. The immovable time timer 504q is a timer for counting a time during which each player object 102a-102d touches the banana object 102b, and is in an immovable state.

The minimum flag 504r is a flag for determining whether or not the degree of splendor of the BGM is "minimum", and is made up of one-bit register. If the minimum flag 504r is turned on, a data value "1" is set to the register. On the other hand, if the minimum flag 504r is turned off, a data value "0" is set to the register. In this embodiment, in a case that the degree of splendor is "normal" or "great", when each player object 102a-102d fails to catch or receive, the minimum flag 504r is turned on.

The normal flag 504s is a flag for determining whether or not the degree of splendor of the BGM is "normal", and is made up of a one-bit register. If the normal flag 504s is turned on, a data value "1" is set to the register. On the other hand, if the normal flag 504s is turned off, a data value "0" is set to the register. In this embodiment, in a case that the degree of splendor is "minimum", when the count value by the consecutive catch counter 504p indicates a first predetermined value (10 in this embodiment), the normal flag 504s is turned on. Alternatively, in a case that the degree of splendor is "excellent", when each player object 102a-102d fails to catch or receive, the normal flag 504s is turned on. Here, in this embodiment, when the rhythm game is started (or when reproducing the BGM is started), the normal flag 504s is turned on, and the degree of splendor of the BGM is set to "normal".

The great flag 504t is a flag for determining whether or not the degree of splendor of the BGM is "great", and is made up of a one-bit register. If the great flag 504t is turned on, a data value "1" is set to the register. On the other hand, if the great flag 504t is turned off, a data value "0" is set to the register. In this embodiment, in a case that the degree of splendor is "normal", when the count value of the consecutive catch counter 504p indicates the first predetermined value or a second predetermined value (20 in this embodiment), the great flag 504t is turned on.

The excellent flag 504u is a flag for determining whether or not the degree of splendor of the BGM is "excellent", and is made up of a one-bit register. If the excellent flag 504u is turned on, a data value "1" is set to the register. If the excellent flag 504u is turned off, a data value "0" is set to the register. In this embodiment, in a case that the degree of splendor is "great", when the count value of the consecutive catch counter 504p indicates the second predetermined value or a third predetermined time (30 in this embodiment), the excellent flag 504u is turned on.

Here, the degree of splendor of the BGM is set to any one of "minimum", "normal", "great" and "excellent", and thus, if any one of the minimum flag 504r, the normal flag 504s, the great flag 504t, and the excellent flag 504u is turned on, the other three are turned off.

The immovable flag 504v is a flag for determining whether or not each player object 102a-102d is in an immovable state, and is made up of a four-bit register corresponding to the respective player objects 102a-102d. If any one of the player objects 102a-102d is in the immovable state, the immovable flag 504v as to the corresponding player object 102a-102d is turned on, and a data value "1" is set to the corresponding bit of the register. On the other hand, if any one of the player objects 102a-102d is not in the immovable state, the immovable flag 504v as to the corresponding player object 102a-102d is turned off, and a data value "0" is set to the corresponding bit of the register. In this embodiment, if the player object 102a-102d touches the banana object 112b, it is in the immovable state. After an elapse of a predetermined time from the state, the immovable state is cancelled.

The damage flag 504w is a flag for determining whether or not each player object 102a-102d is in a damaged state, and is made up of a four-bit register corresponding to the respective player objects 102a-102d. If any one of the player objects 102a-102d is in the damaged state, the damage flag 504w as to the corresponding player object 102a-102d is turned on, and a data value "1" is set to the corresponding bit of the register. On the other hand, if any one of the player objects 102a-102d is not in the damaged state or in the recovered state, the damage flag 504w as to the corresponding player object 102a-102d is turned off, and a data value "0" is set to the corresponding bit of the register. In this embodiment, if each player object 102a-102d touches the iron ball object 112c, it is in the damaged state (after reproducing animation in which the player object is damaged), and then in the recovered state.

Figure 18:
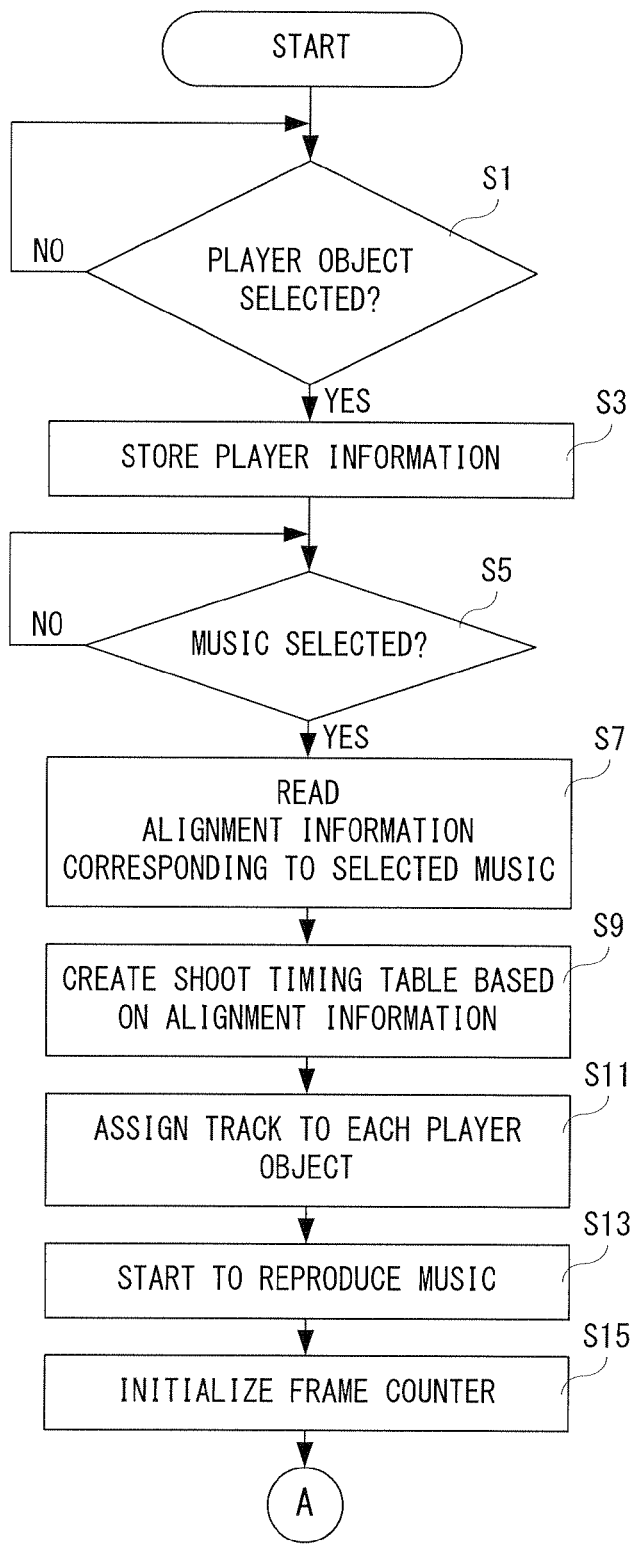
FIG. 18 shows an example non-limiting first part of game entire processing by a CPU shown in FIG. 2.

FIG. 18-FIG. 22 shows an example non-limiting game entire processing of the rhythm game by the CPU 40 shown in FIG. 2. As shown in FIG. 18, when starting the game entire processing, the CPU 40 determines whether or not any one of the player objects 102a-102d is selected in a step S1. Although illustration is omitted, when the game entire processing of the rhythm game is started, after the number of players and the number of computer players are decided, a selection screen for allowing each player (computer player may be included) to select any one of the player objects 102a-102d to be operated (used) is displayed. On the selection screen, the player object 102a-102d as to each of the 1P-4P is selected.

If "NO" in the step S1, that is, if no player object 102a-102d is selected, the process returns to the same step S1. On the other hand, if "YES" in the step S1, that is, if the player object 102a-102d is selected, player information is stored in a step S3. That is, in correspondence with each of the players 1P-4P, player information data 504*f* indicating the selected player object 102*a*-102*d* is stored in the data memory area 504. As described above, the color of each of the players 1P-4P is decided in advance, and thus, the player information data 504*f* is stored to thereby assign the color to each of the player objects 102*a*-102*d*.

Succeedingly, in a step S5, it is determined whether or not music (BGM) is selected. Although illustration is omitted, after the player object 102*a*-102*d* is selected, a selection screen for selecting a BGM is displayed, and it is determined whether or not a BGM is selected on the selection screen according to an operation by the player.

If "NO" in the step S5, that is, if the music (BGM) is not selected, the process returns to the step S5 as it is. On the other hand, if "YES" in the step S5, that is, if the music (BGM) is selected, alignment information (alignment information data 5050, alignment information 2 data 5052, . . . ) corresponding to the selected music (first BGM data 5040, second BGM data 5042, . . . ) is read in in a step S7. In a next step S9, a shoot timing table is created on the basis of the alignment information. That is, from the read first alignment information data 5050, the read second alignment information data 5052, . . . , shoot data 504*h* is generated.

Successively, in a step S11, a track is assigned to each player object 102*a*-102*d*. In this embodiment, each of the four tracks included in the alignment information is arbitrarily (randomly) assigned to each of the player objects 102*a*-102*d*. That is, the track assignment data 504*g* is decided and stored in the data memory area 504. Then, in a step S13, reproducing the music (BGM) is started. That is, the CPU 40 gives an instruction of reproducing the selected music (BGM) to the DSP 52. Thus, the DSP 52 generates audio data from the BGM data 504*c* (first BGM data 5040, second BGM data 5042, . . . ) corresponding to the music (BGM), and starts to reproduce the BGM. Here, as described above, when the game entire processing (rhythm game) is started, or when reproducing the BGM is started, the degree of splendor of the BGM is set to "normal". That is, the normal flag 504*s* is in an on state. Accordingly, in the step S13, the BGM 1 is reproduced at a 100% volume.

Figure 19:
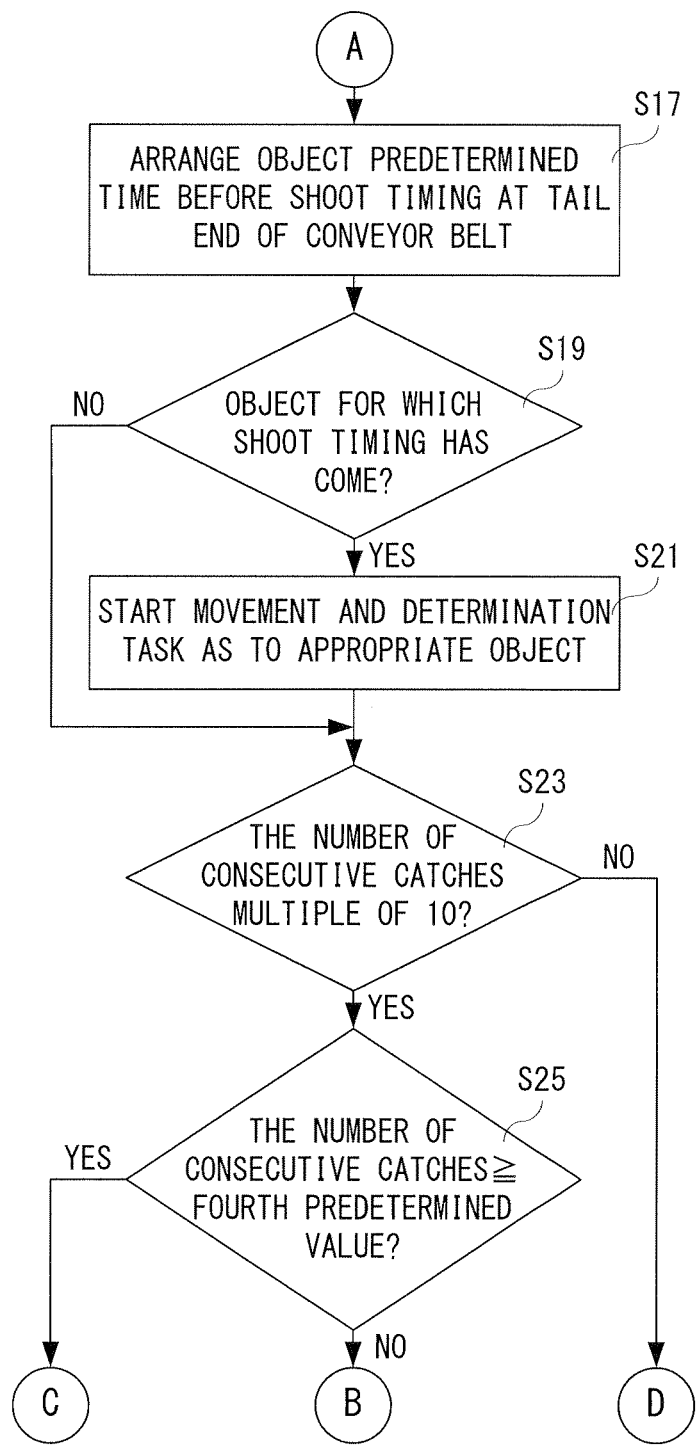
FIG. 19 shows an example non-limiting second part of the game entire processing by the CPU shown in FIG. 2.
Figure 20:
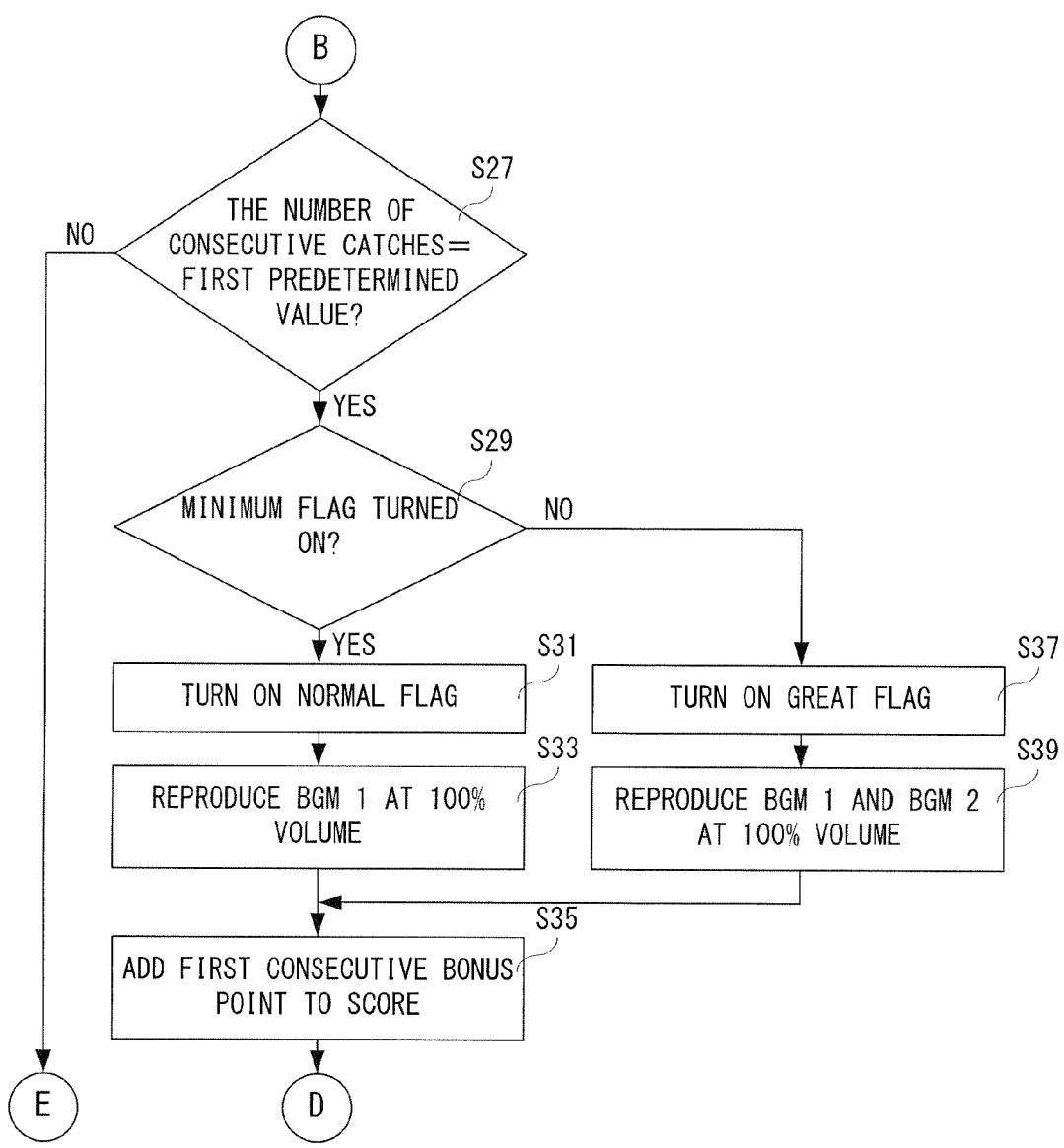
FIG. 20 shows an example non-limiting third part of the game entire processing by the CPU shown in FIG. 2.

In a next step S15, the frame counter 504*n* is initialized (count value=0). As shown in FIG. 19, in a succeeding step S17, any object 110,112 predetermined time (2 sec. (120 frames) in this embodiment) before the shoot timing is arranged at the tail end (right end) of the conveyor belt object 106. At this time, the shoot timing table corresponding to the shoot data 504*h* is referred. Although illustration is omitted, the object 110, 112 thus arranged is moved into the shooting platform object 106 by the conveyor belt object 106 within a predetermined time (120 frames, for example).

In a succeeding step S19, it is determined whether or not there is an object 110, 112 for which a shoot timing has come. Here, the CPU 40 determines whether or not there is a shooting timing frame which is coincident with the number of frames indicated by the count value of the frame counter 504*n* with reference to shoot timing table corresponding to the shoot data 504*h*.

If "NO" in the step S19, that is, if there is no object 110, 112 for which a shoot timing has come, the process proceeds to a step S23 as it is. On the other hand, if "YES" in the step S19, that is, if there is an object 110, 112 for which a shoot timing has come, a movement and determination task of the relevant object 110, 112 is started in a step S21, and the process proceeds to the step S23. In the step S21, the CPU 40 starts the object movement and determination task as to the object 110, 112 indicated by the classification included in the relevant object information with reference to the alignment information corresponding to the alignment data 504*d* according to the track number and the arrival order that are described by being brought into correspondence with the shooting timing frame which is coincident with the current frame. Here, as to the object moving and determining processing (FIG. 23-FIG. 25, FIG. 26-FIG. 27), a description is made in detail later.

In the step S23, it is determined whether or not the number of consecutive catches is a multiple of 10. That is, the CPU 40 determines whether or not the count value of the consecutive catch counter 504*p* is a multiple of 10. If "NO" in the step S23, that is, if the number of consecutive catches is not a multiple of 10, the process proceeds to a step 65 shown in FIG. 22. On the other hand, if "YES" in the step S23, that is, if the number of consecutive catches is a multiple of 10, it is determined whether or not the number of consecutive catches is equal to or more than a fourth predetermine value (40, for example) in a step S25.

Figure 22:
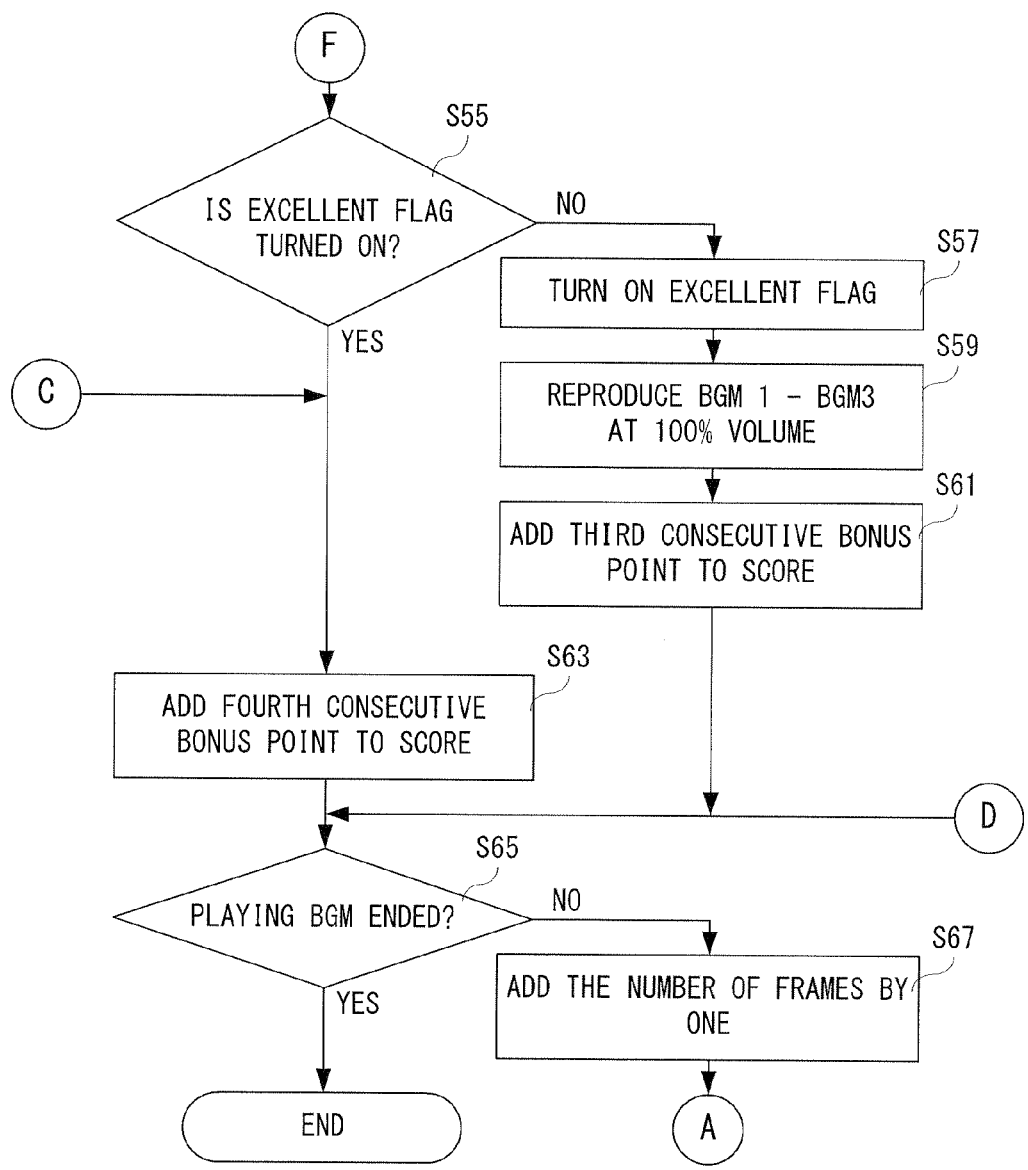
FIG. 22 shows an example non-limiting fifth part of the game entire processing by the CPU shown in FIG. 2.

If "YES" in the step S25, that is, if the number of consecutive catches is equal to or more than the fourth predetermine value, a state in which the degree of splendor of the BGM is "excellent" is hold, and the process proceeds to a step S63 shown in FIG. 22. On the other hand, if "NO" in the step S25, that is, if the number of consecutive catches is not equal to or more than the fourth predetermine value, it is determined whether or not the number of consecutive catches is a first predetermined value (10, for example) in a step S27 shown in FIG. 20.

Figure 21:
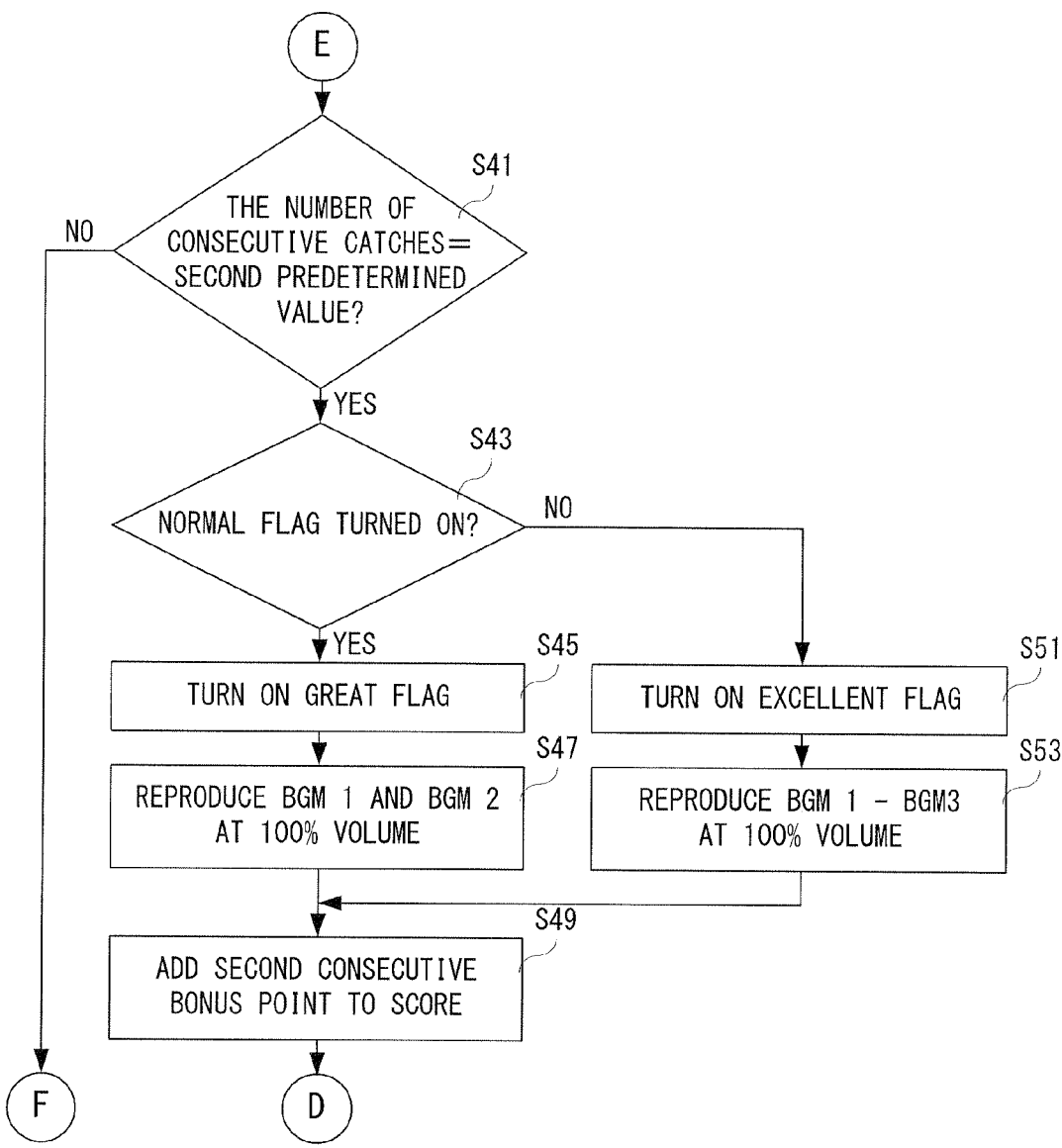
FIG. 21 shows an example non-limiting fourth part of the game entire processing by the CPU shown in FIG. 2.

If "NO" in the step S27, that is, if the number of consecutive catches is not the first predetermined value, it is determined that the number of consecutive catches is a second predetermined value (20, for example) or a third predetermined value (30, for example), and the process proceeds to a step S41 shown in FIG. 21. On the other hand, if "YES" in the step S27, that is, if the number of consecutive catches is the first predetermined value, it is determined whether or not the minimum flag 504*r* is turned on in a step S29.

If "YES" in the step S29, that is, if the minimum flag 504*r* is turned on, it is determined that the degree of splendor of the BGM is "minimum", the normal flag 504*s* is turned on in a step S31, and the BGM 1 is reproduced at a 100% volume in a step S33. That is, in the step S33, according to an instruction from the CPU 40, the DSP 52 changes the volume of the four tracks making up of the BGM 1 to maximum (100%). In addition, in a step S35, a first consecutive bonus point (50 points, for example) is added to the score, and the process proceeds to the step S65. That is, in the step S35, the CPU 40 adds the first consecutive bonus point to the score indicated by the score data 504*m*, and updates the score data 504*m*. At this time, the display of the score 120 displayed on the game screen 100 is also updated. This holds true for a case that points are added to the score below.

Although illustration is omitted, when the normal flag 504*s* is turned on in the step S31, the minimum flag 504*r* is turned off.

On the other hand, if "NO" in the step S29, that is, if the minimum flag 504*r* is turned off, since the normal flag 504*s* is turned on, the great flag 504*t* is turned on in a step S37, the BGM 1 and the BGM 2 are reproduced at a 100% volume in a step S39, and the process proceeds to the step S35. That is, in the step S39, according to an instruction from the CPU 40, the DSP 52 reproduces the BGM 2 at a 100% volume in addition to the BGM 1.

Although illustration is omitted, in the step S37, when the great flag 504*t* is turned on, the normal flag 504*s* is turned off. This holds true in a step S45 described later.

As shown in FIG. 21, it is determined whether or not the number of consecutive catches is the second predetermined value in a step S41. That is, the CPU 40 determines whether or not the count value of the consecutive catch counter 504*p* is the second predetermined value. If "NO" in the step S41, that is, if the number of consecutive catches is the third predetermined value, the process proceeds to a step S55 shown in FIG. 22. On the other hand, if "YES" in the step S41, that is, if the number of consecutive catches is the second predetermined value, it is determined whether or not the normal flag 504*s* is turned on in a step S43.

If "YES" in the step S43, that is, if the normal flag 504*s* is turned on, the great flag 504*t* is turned on in a step S45, the BGM 1 and the BGM 2 are reproduced at a 100% volume in a step S47, a second consecutive bonus point (100 points, for example) is added to the score in a step S49, and the process proceeds to the step S65 shown in FIG. 22.

On the other hand, if "NO" in the step S43, that is, if the normal flag 504*s* is turned off, since the great flag 504*t* is turned on, the excellent flag 504*u* is turned on in a step S51, the BGM 1-BGM 3 are reproduced at a 100% volume in a step S53, and the process proceeds to the step S49. That is, in the step S53, the DSP 52 reproduces the BGM 3 at a maximum volume (100%) in addition to the BGM 1 and the BGM 2 according to an instruction from the CPU 40.

Although illustration is omitted, when the excellent flag 504*u* is turned on in the step S51, the great flag 504*t* is turned off. This holds true in a step S57 described later.

As shown in FIG. 22, in the step S55, it is determined whether or not the excellent flag 504*u* is turned on. If "NO" in the step S55, that is, if the great flag 504*t* is turned on, the excellent flag 504*u* is turned on in the step S57, the BGM 1-BGM 3 are reproduced at a 100% volume in a step S59, a third consecutive bonus point (150 points, for example) is added to the score in a step S61, and the process proceeds to the step S65.

On the other hand, if "YES" in the step S55, that is, if the excellent flag 504*u* is turned on, a fourth consecutive bonus point (200 points, for example) is added to the score in the step S63, and the process proceeds to the step S65. In the step S65, it is determined whether or not playing the BGM is ended. That is, the CPU 40 determines whether or not the selected first BGM data 5040, second BGM data 5042, . . . are reproduced to the end (until the last frame).

If "NO" in the step S65, that is, if playing the BGM is not ended, the number of frames is added by 1, that is, the count value by the frame counter 504*n* is added by 1 in a step S67, and the process returns to the step 17 shown in FIG. 19. Although detailed description is omitted, a scan time from the steps S17 to S67 is one frame. On the other hand, if "YES" in the step S65, that is, if playing the BGM is to be ended, the game entire processing is ended.

Figure 23:
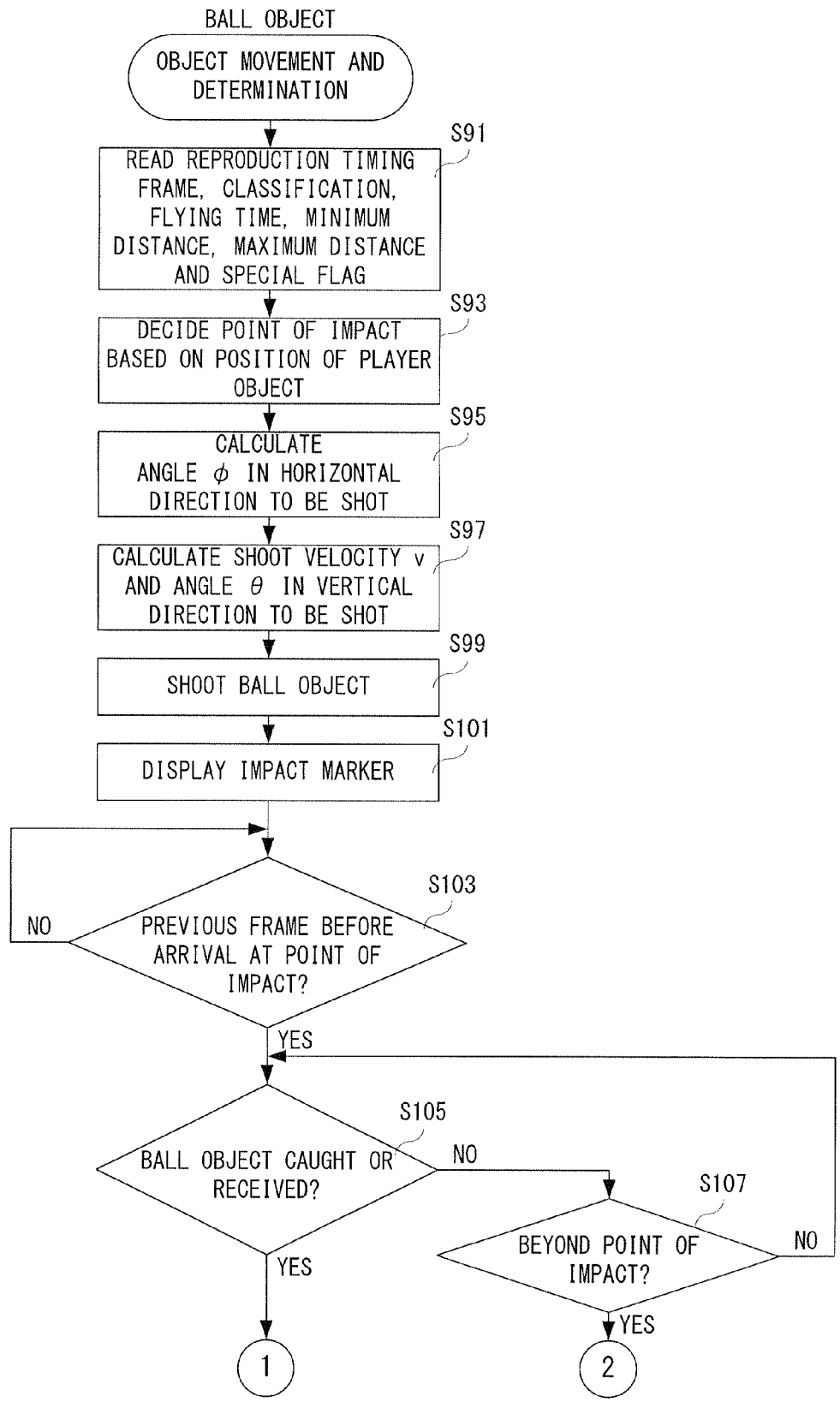
FIG. 23 shows an example non-limiting part of object moving and determining processing (ball object) by the CPU shown in FIG. 2.
Figure 24:
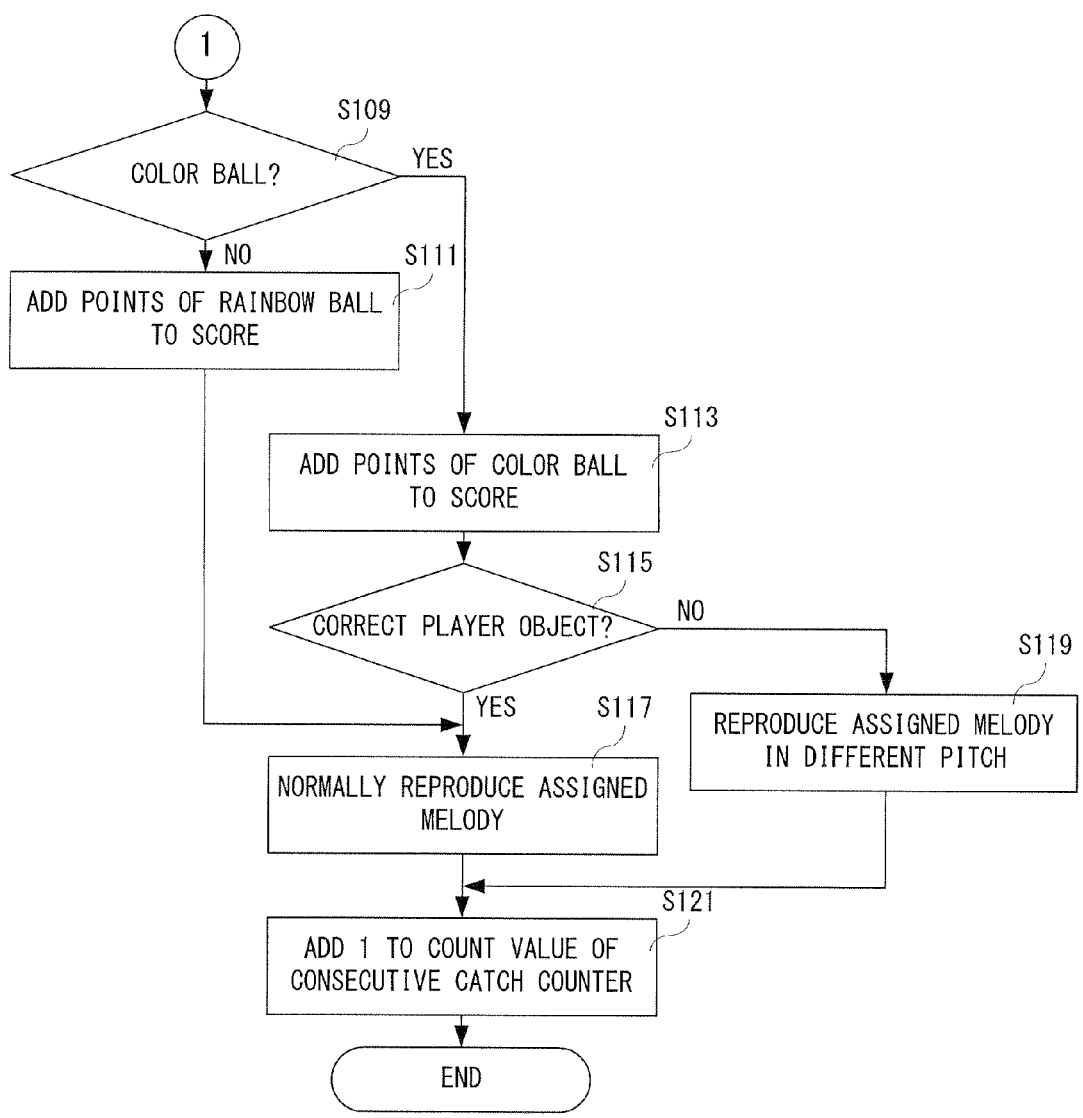
FIG. 24 shows an example non-limiting another part of the object moving and determining processing (ball object) by the CPU shown in FIG. 2.
Figure 25:
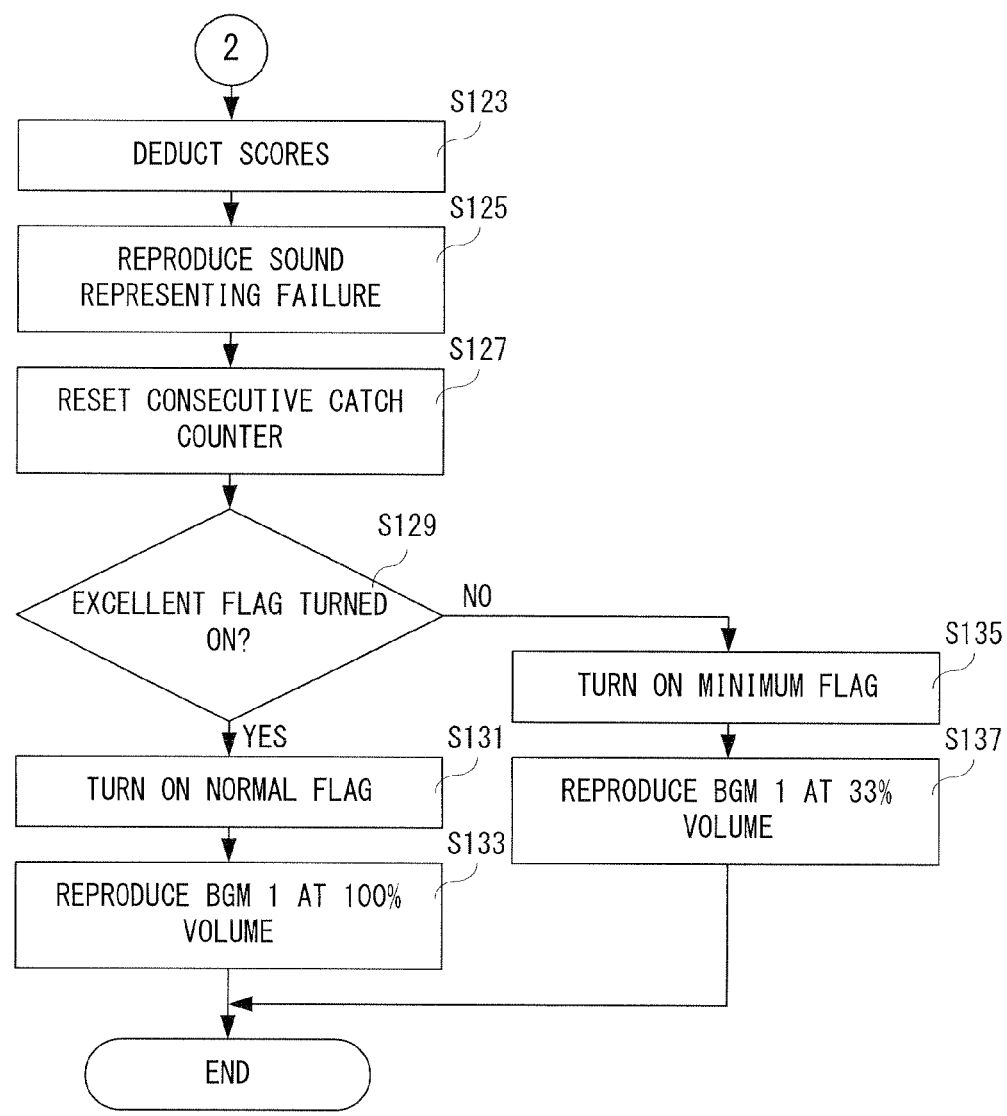
FIG. 25 shows an example non-limiting still another part of the object moving and determining processing (ball object) by the CPU shown in FIG. 2.

FIG. 23-FIG. 25 show an example non-limiting flowcharts showing object moving and determining processing. The object moving and determining processing is started in a case that an object moving and determining task as to the ball object 110 is started, and executed for each ball object 110 in parallel with the game entire processing. This holds true for object moving and determining processing as to the item object 112 (FIG. 26-FIG. 27) described later.

As shown in FIG. 23, when starting the object moving and determining processing, the CPU 40 reads a reproduction timing frame, a classification (identification information of a melody), a flying time, a minimum distance, a maximum distance and a special flag in a step S91.

Although a detailed description is omitted, at a time when the object moving and determining processing is started, a track from which the reproduction timing frame, etc. is read is decided, and thus, the color of the corresponding one of the player objects 102*a*-102*d* to which the track is assigned and the color ball object 110*a* are also decided. It should be noted that in a case that the special flag is turned on, the rainbow ball object 110*b* is decided.

In a next step S93, the point of impact B is decided on the basis of the position of any one of the player objects 102*a*-102*d*. Here, as described by using FIG. 15(A), the CPU 40 arbitrarily decides the point of impact B within the predetermined range defined by the minimum distance (radius r) and the maximum distance (radius R) taking the current position P of the corresponding player object 102*a*-102*d* as a center. In a succeeding step S95, the angle φ in the horizontal direction to be shot is calculated according to Equation 2. In addition, in a step S97, the shoot velocity (initial velocity) v and the angle θ in the vertical direction to be shot are calculated according to Equation 3 and Equation 6.

Succeedingly, in a step S99, the ball object 110 is shot. At this time, if the special flag is turned on, the rainbow ball object 110*b* is shot. On the other hand, if the special flag is turned off, the color ball object 110*a* in color decided in advance is shot as described above. Here, the shoot direction is deiced by the angle φ in the horizontal direction and the angle θ in the vertical direction, and the initial velocity in shooting is the velocity v.

In addition, in a step S101, the impact marker 114 representing the predetermined range including the point of impact B is displayed. In a next step S103, it is determined whether or not a timing when a predetermined frames before the ball object 110 arrives at the point of impact B has come. Here, the CPU 40 determines whether or not the count value by the frame counter 504*n* is predetermined frames (five frames) before the reproduction timing frame read in the step S91. If "NO" in the step S103, that is, if a timing when the predetermined frames before the ball object 110 arrives at the point of impact B has not come, the process returns to the same step S103. Here, for simplicity, if "NO" in the step S103, the process returns to the step S103 as it is, but the movement of the ball object 110 is actually controlled according to the calculation of physics as to a projectile motion, and the situation is displayed on the game screen 100. This holds true for the item object 112 described later.

On the other hand, if "YES" in the step S103, that is, if a timing when the predetermined frames before the ball object 110 arrives at the point of impact B has come, it is determined whether or not the ball object 110 is caught or received in a step S105. As described above, in this embodiment, the CPU 40 determines whether or not the ball object 110 is caught depending on whether or not the point of impact B of the ball object 110 is included within the first predetermined range taking each player object 102*a*-102*d* as a center in a case that the player does not swing the first controller 34. On the other hand, the CPU 40 determines whether or not the ball object 110 is received (caught by rolling) depending on whether or not the point of impact B of the ball object 110 is included within the second predetermined range taking each player object 102*a*-102*d* as a center in a case that the player swings the first controller 34.

If "YES" in the step S105, that is, if the ball object 110 is caught or received, the process proceeds to a step S109 shown in FIG. 24. On the other hand, if "NO" in the step S105, that is, if the ball object 110 is not caught or received, it is determined whether or not the ball object 110 goes beyond the point of impact B in a step S107. That is, the CPU 40 determines whether or not the count value by the frame counter 504n is above the reproduction timing frame read in the step S91.

If "NO" in the step S107, that is, if the ball object 110 does not go beyond the point of impact B, the process returns to the step S105 as it is. On the other hand, if "YES" in the step S107, that is, if the ball object 110 goes beyond the point of impact B, it is determined that catching or receiving fails, and the process proceeds to a step S123 shown in FIG. 25.

As shown in FIG. 24, in the step S109, it is determined whether or not the ball object 110 is the color ball object 110a. Here, the CPU 40 determines whether or not the special flag read in the step S91 is turned off. If "NO" in the step S109, that is, if the ball object 110 is the rainbow ball object 110b, points with respect to the rainbow ball (50 points, for example) is added to the score in a step S111, and the process proceeds to a step S117.

On the other hand, if "YES" in the step S109, that is, if the ball object 110 is the color ball object 110a, points with respect to the color ball (10 points, for example) is added to the score in a step S113, and it is determined whether a correct player object 102a-102d or not in a step S115. That is, the CPU 40 determines whether or not the corresponding one of the player objects 102a-102d to which the track including the object information is assigned catches or receives the color ball object 110a with reference to the player information data 504f.

If "YES" in the step S115, that is, if the corresponding player object 102a-102d is the correct one, an assigned sound, that is, a melody indicated by the classification is normally reproduced in the step S117, and the process proceeds to a step S121. Thus, in response to the ball object 110 being caught or received, the melody of the part (track) of which the corresponding player object 102a-102d is in charge is reproduced as it is. Although detailed description is omitted, the melody is reproduced at the reproduction timing frame read in the step S91. This holds true for a step S119 described later.

On the other hand, if "NO" in the step S115, that is, if the corresponding player object 102a-102d is not the correct one, the assigned sound, that is, the melody indicated by the classification is reproduced in a different pitch in the step S119, and the process proceeds to the step S121.

In the step S121, the count value of the consecutive catch counter 504p is added by one to thereby end the object moving and determining processing. It should be noted that in a case that the player object 102a-102d operated by the computer player catches or receives the color ball object 110, points may not be added to the score in the step S111, and the number of counts by the consecutive catch counter 504p may not be added in the step S119.

On the other hand, if "YES" is determined in the step S107 as shown in FIG. 23, the score is deducted in the step S123 shown in FIG. 25. That is, the CPU 40 subtracts points (10 points, for example) from the score indicated by the score data 504m in a case that catching or receiving fails, to thereby update the score data 504m. This holds true for a case that the score is deducted below. In a next step S125, a sound representing failure (sound effect) is reproduced. Here, according to an instruction from the CPU 40, the GPU 52 reads the note data 504e (sound data) corresponding to the sound effect representing failure to generate the audio data. In addition, in a step S127, the consecutive catch counter 504p is reset (count value is set to 0), and in a step S129, it is determined whether or not the excellent flag 504u is turned on.

If "YES" in the step S129, that is, if the excellent flag 504u is turned on, the normal flag 504s is turned on in a step S131, the BGM 1 is reproduced at a 100% volume in a step S133, and the object moving and determining processing is ended. That is, in the step S131, the DSP 52 makes the volume as to the track making up of the BGM 2 and BGM 3 to minimum (0%).

Although illustration is omitted, when the normal flag 504s is turned on in the step S131, the excellent flag 504u is turned off. As described later, this holds true for a case that the minimum flag 504r is turned on in a step S135.

On the other hand, if "NO" in the step S129, that is, if the excellent flag 504u is turned off, the minimum flag 504r is turned on in the step S135, the BGM 1 is reproduced at a 33% volume in a step S137, and then, the object moving and determining processing is ended. That is, in the step S137, in a case that the DSP 52 reproduces the BGM 1 at 100% volume, a volume of four tracks making up of the BGM 1 is reduced to 33%. Or, in a case that the DSP 52 reproduces the BGM 1 and the BGM 2 at 100% volume, a volume of the four tracks making up of the BGM 1 is reduced to 33%, and a volume making up of the BGM 2 is reduced to the minimum.

Here, when "NO" is determined in the step S129, if the minimum flag 504r is turned on, the CPU 40 ends the object moving and determining processing without execution of the processing in the steps S135 and S137.

It should be noted that in the object moving and determining processing shown in FIG. 23-FIG. 25, a series of processing is executed, and therefore, the scan time of the steps S91-S137 is not one frame. This holds true for the following object moving and determining processing as to the item object 112.

Although omitted in FIG. 23-FIG. 25, in a case that each of the player objects 102a-102d catches or receives the ball object 110, a scene in which it catches or receives the ball object 110, and the ball object 110 is then erased is displayed. On the other hand, in a case that each of the player objects 102a-102d fails to catch or receive the ball object 110, the ball object 110 bounces once or twice on the ground, and is then erased.

Figure 26:
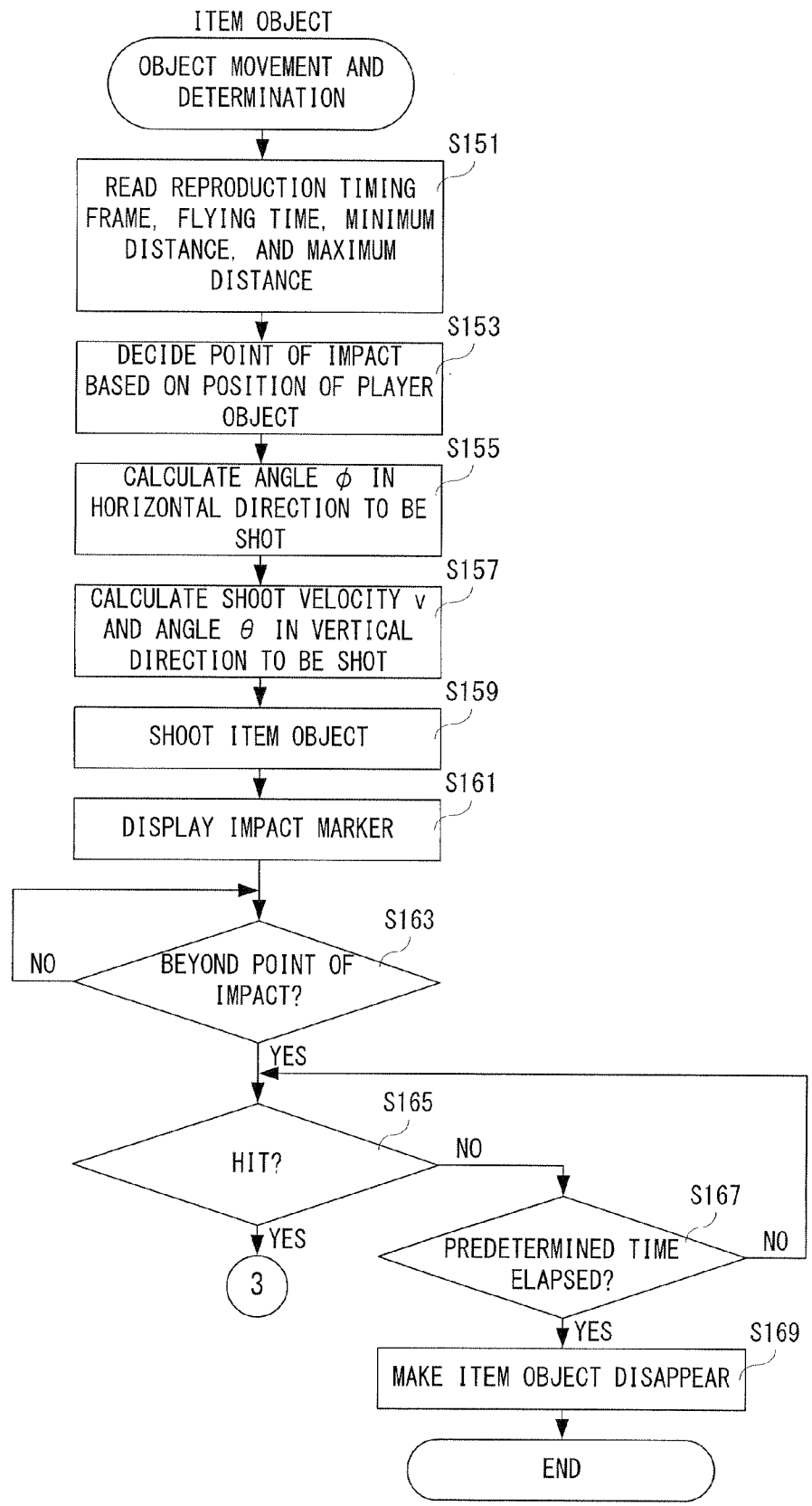
FIG. 26 shows an example non-limiting part of object moving and determining processing (item object) by the CPU shown in FIG. 2.

FIG. 26 and FIG. 27 show an example non-limiting flowcharts showing object moving and determining processing as to the item object 112. Here, a part of the object moving and determining processing as to the item object 112 is the same as the above-described object moving and determining processing as to the ball object 110, and therefore, a redundant content is simply described. Furthermore, the object moving and determining processing is executed for each item object 112 in parallel with the game entire processing and the object moving and determining processing as to the ball object 110.

As shown in FIG. 26, when starting the object moving and determining processing, the CPU 40 reads a reproduction timing frame, a flying time, a minimum distance and a maximum distance in a step S151.

Although detailed description is omitted, at a time when the object moving and determining processing is started, a track from which a reproduction timing frame, etc. is read is decided, and thus, the player object 102a-102d to which the track is assigned is also decided. At a time when the task as to the object 110, 112 at a shoot timing (step S21 in the game entire processing) is started, the kind of the item object 112

(identification of the coin object 112a, the banana object 112b, the iron ball object 112c) is also specified.

Returning to FIG. 26, in a step S153, the point of impact B is decided on the basis of the position P of each player objects 102a-102d, and in a step S155, the angle φ in the horizontal direction to be shot is calculated, and in a step S157, the shoot velocity v and the angle θ in the vertical direction to be shot are calculated. Then, in a step S159, the item object 112 (coin object 112a, banana object 112b, or iron ball object 112c) is shot. In a succeeding step S161, the impact marker 116 indicating the predetermined range including the point of impact is displayed. Here, in a case of the coin object 112a, the impact marker 116 is not displayed, and thus, the processing is not executed.

Then, in a step S163, it is determined whether or not the item object 112 goes beyond the point of impact. If "NO" in the step S163, the process returns to the step S163 as it is. On the other hand, if "YES" in the step S163, it is determined whether a hit or not in a step S165. Here, unlike the case of the ball object 110, it is determined whether or not each of the player objects 102a-102d and the item object 112 is hit.

Although detailed description is omitted, even directly before the item object 112 arrives at the point of impact B, it may be determined that the item object 112 hits each player object 102a-102d. In such a case also, "YES" is determined in the step S165.

If "NO" in the step S165, that is, if there is no hit, it is determined whether or not a predetermined time has elapsed in a step S167. Here, as described above, the predetermined time is different depending on the kind of the item object 112. More specifically, in a case of the coin object 112a, the predetermined time is 3 sec., and in a case of the banana object 112b, the predetermined time is 4 sec., and in a case of the iron ball object 112c, the predetermined time is 2 sec.

If "NO" in the step S167, that is, if the predetermined time has not elapsed, the process returns to the step S165. Although illustration is omitted, the coin object 112a and the banana object 112b remain at the fall position at this time. Alternatively, at this time, the iron ball object 112c bounces at the fall position, and moves to the progressing direction. On the other hand, if "YES" in the step S167, that is, if the predetermined time has elapsed, the item object 112 is made to disappear in a step S169, and the object moving and determining processing is ended.

Alternatively, if "YES" in the step S165, that is, if there is a hit, processing depending on the kind of the item object 112 is executed as shown in FIG. 27(A)-(C).

As shown in FIG. 27(A), in a case of the coin object 112a, points of the coin object 112a (10 points, for example) are added to the score in a step S171, the coin object 112a is erased in a step S173, and the object moving and determining processing is ended. That is, coins are obtained by each player object 102a-102d, and the points corresponding thereto are added.

As shown in FIG. 27(B), in a case of the banana object 112b, the immovable flag 504v is turned on in a step S181, the banana object 112b is erased in a step S183, and the object moving and determining processing is ended. Here, in the step S181, a data value "1" is set to the bit of the register corresponding to any player object 102a-102d which touches the banana object 112b. Thus, in this case, the corresponding player object 102a-102d slips and falls, and is in an immovable state for a while.

As shown in FIG. 27(C), in a case of the iron ball object 112c, the damage flag 504w is turned on in a step S191. Here, a data value "1" is set to the bit of the register corresponding to any player object 102a-102d which touches the iron ball object 112c. In a next step S193, points (50 points, for example) of the iron ball object 112c is subtracted from the score. In addition, in a step S195, the consecutive catch counter 504p is reset. Then, in a step S197, the iron ball object 112c is erased, and the object moving and determining processing is ended.

Figure 28:
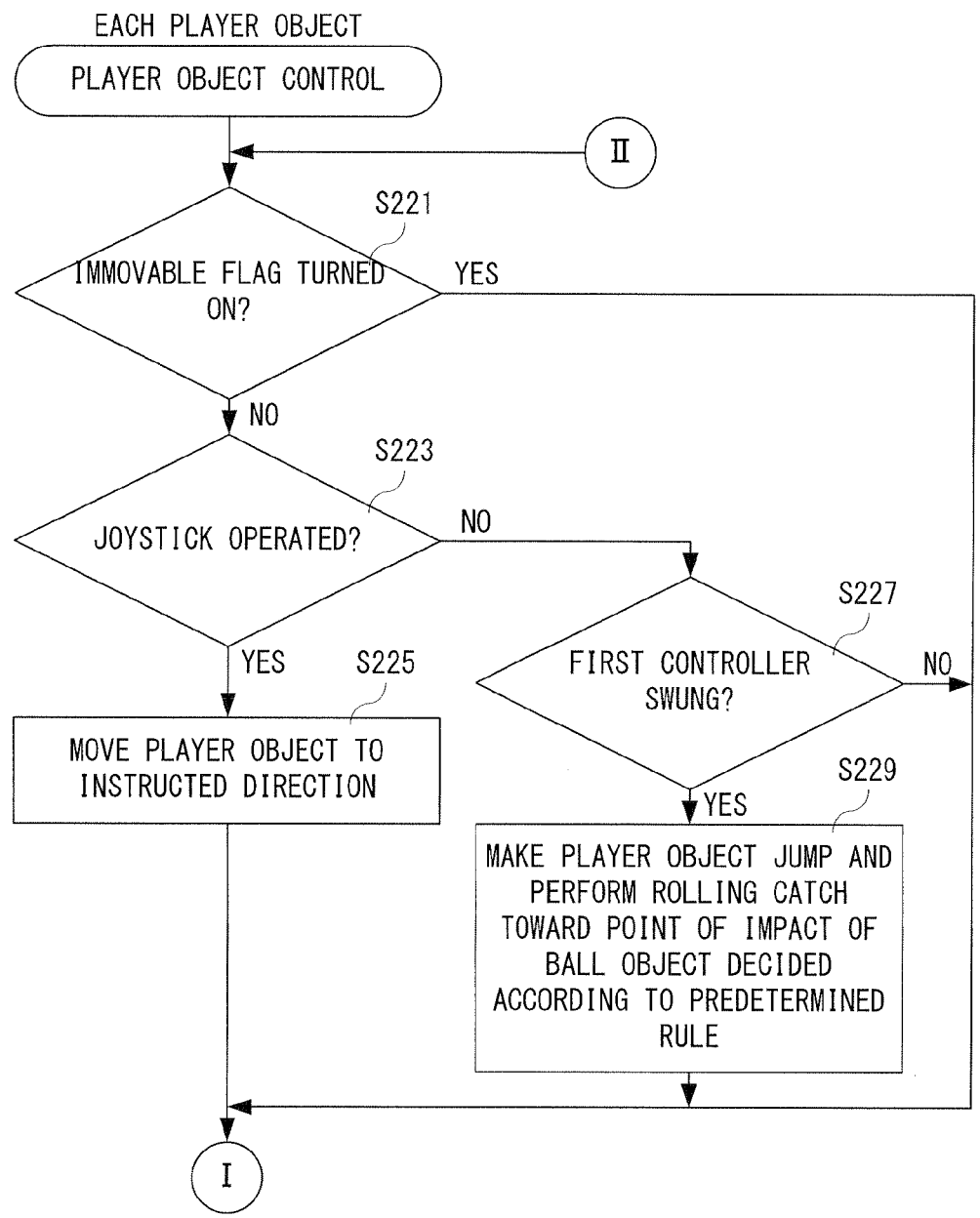
FIG. 28 shows an example non-limiting part of player object controlling processing by the CPU shown in FIG. 2.
Figure 29:
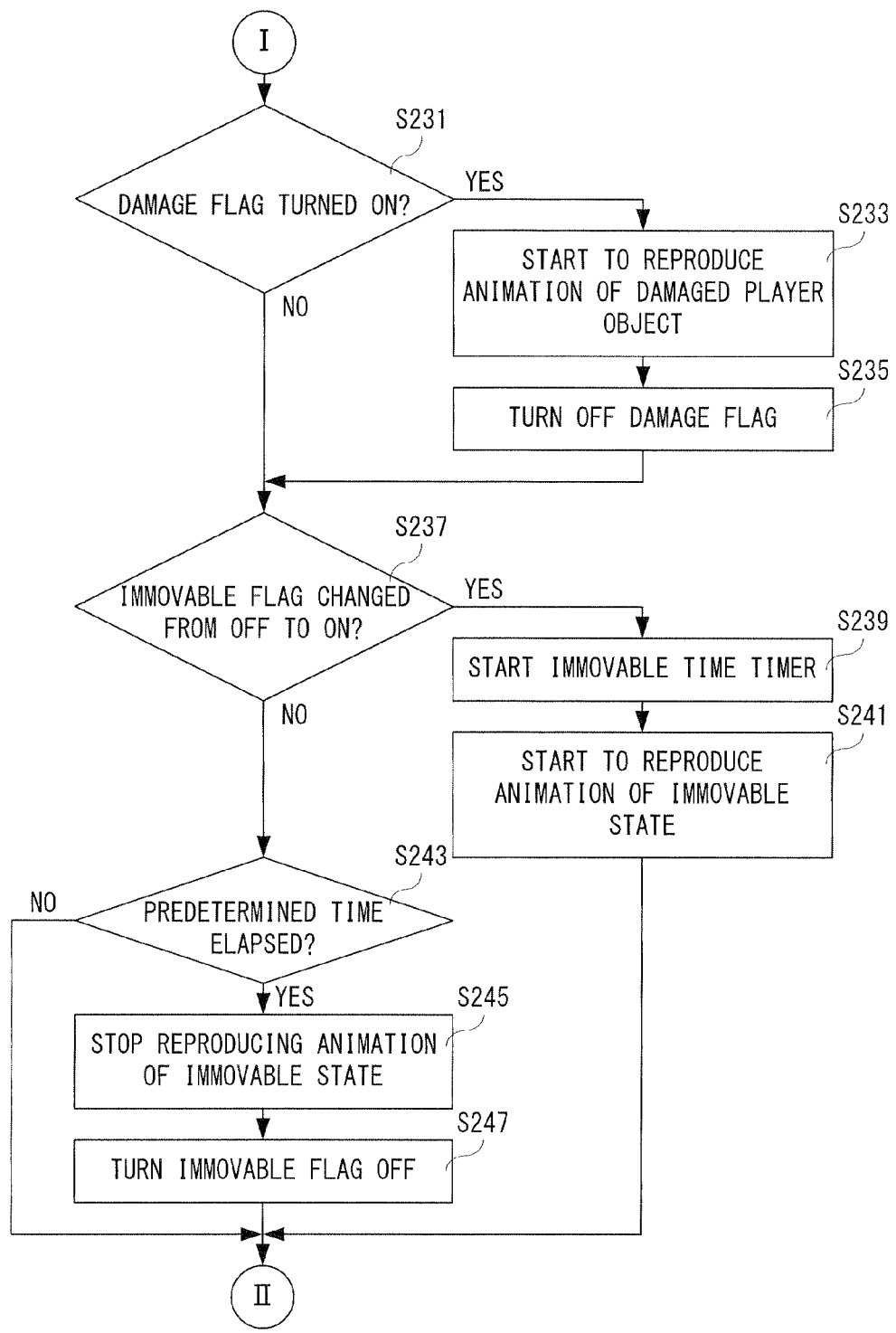
FIG. 29 shows an example non-limiting another part of the player object controlling processing by the CPU shown in FIG. 2.

FIG. 28 and FIG. 29 show an example non-limiting flowcharts of player object controlling processing. The player object controlling processing is executed for each player object 102a-102d in parallel with the above-described game entire processing, and the object moving and determining processing as to the ball object 110 and the item object 112. Accordingly, the player object 102a-102d as an object to be operated is called the "appropriate player object 102a-102d".

As shown in FIG. 28, when starting the player object controlling processing, the CPU 40 determines whether or not the immovable flag 504v is turned on in a step S221. Here, the CPU 40 determines whether or not a data value "1" is set to the bit corresponding to the appropriate player object 102a-102d out of the four bits making up of the immovable flag 504v.

If "YES" in the step S221, that is, if the immovable flag 504v is turned on, it is determined that the appropriate player object 102a-102d is never moved according to an operation by the player, and the process proceeds to a step S231 shown in FIG. 29. On the other hand, if "NO" in the step S221, that is, if the immovable flag 504v is turned off, it is determined whether or not there is an operation by the joystick 94a in a step S223. Here, the CPU 40 determines whether or not the operation data of the joystick 94a is included in the controller data with reference to the operation data buffer 504a.

If "NO" in the step S223, that is, if there is no operation by the joystick 94a, the process proceeds to a step S227 described later. On the other hand, if "YES" in the step S223, that is, if there is an operation by the joystick 94a, the appropriate player object 102a-102d is moved in an instructed direction in a step S225, and the process proceeds to a step S231.

In a step S227, it is determined whether or not the first controller 34 is swung. Here, the CPU 40 detects, in a case that the acceleration data from the first controller 34 is included in the controller data with reference to the operation data buffer 504a, a movement of the first controller 34 itself on the basis of changes in the acceleration value based on the acceleration data, and determines whether or not the first controller 34 is swung up and down or right and left, or the like.

If "NO" in the step S227, that is, if the first controller 34 is not swung, the process proceeds to the step S231 as it is. On the other hand, if "YES" in the step S227, that is, if the first controller 34 is swung, the appropriate player object 102a-102d is made to jump and perform a rolling-catch toward the point of impact of the ball object 110 B as a target which is decided according to the above-described predetermined rule in a step S229, and the process proceeds to the step S231. That is, in the step S229, an animation in which the appropriate player object 102a-102d jumps and performs a rolling catch toward the point of impact B starts to be reproduced. Although illustration is omitted, reproducing the animation in which the appropriate player object 102a-102d jumps and performs a rolling catch is started, and ended after a predetermined time (predetermined number of frames).

As shown in FIG. 29, it is determined whether or not the damage flag 504w is turned on in the step S231. Here, the CPU 40 determines whether or not the data value "1" is set to the bit corresponding to the appropriate player object 102*a*-102*d* out of the four bits making up of the damage flag 504*w*.

If "NO" in the step S231, that is, if the damage flag 504*w* is turned off, the process proceeds to a step S237 as it is. On the other hand, if "YES" in the step S231, that is, if the damage flag 504*w* is turned on, an animation in which the appropriate player object 102*a*-102*d* is damaged starts to be reproduced in a step S233, the damage flag 504*w* is turned off in a step S235, and the process proceeds to the step S237.

Here, in the step S235, the data value "0" is set to the bit corresponding to the appropriate player object 102*a*-102*d* out of the four bits making up of the damage flag 504*w*. Although illustration is omitted, reproducing the animation in which the appropriate player object 102*a*-102*d* is damaged is started, and then ended after a predetermined time (predetermined number of frames).

In the step S237, it is determined whether or not the immovable flag 504*v* switches from off to on. Here, the CPU 40 determines whether or not a data value "1 is set to the bit corresponding to the appropriate player object 102*a*-102*d* out of the four bits making up of the immovable flag 504*v*, and the data value "0" is set at the frame directly before.

If "YES" in the step S237, that is, if the immovable flag 504*v* switches from off to on, the immovable time timer 504*q* is started in a step S239, an animation in which the appropriate player object 102*a*-102*d* is immovable starts to be reproduced in a step S241, and the process returns to the step S221 shown in FIG. 28.

On the other hand, if "NO" in the step S237, that is, if the on state or the off state of the immovable flag 504*v* is hold, it is determined whether or not a predetermined time has elapsed in a step S243. Here, the CPU 40 determines whether or not the timer value of the immovable time timer 504*q* is above the predetermined time (2 sec., for example). If "NO" in the step S243, that is, if the predetermined time has not elapsed, it is determined that the immovable state is not hold, or the immovable state is not cancelled, and the process returns to the step S221.

However, if "YES" in the step S243, that is, if the predetermined time has elapsed, it is determined that the immovable state is canceled, the animation in which the appropriate player object 102*a*-102*d* is immovable stops to be reproduced in a step S245, the immovable flag 504*v* is turned off in a step S247, and the process returns to the step S221.

Here, in the step S247, a data value "0" is set to the bit corresponding to the appropriate player object 102*a*-102*d* out of the four bits making up of the immovable flag 504*v* is set.

Here, a scan time of the player object controlling processing shown in FIG. 28 and FIG. 29 is one frame.

According to this embodiment, when a ball object to be dropped in timing to the tune of the BGM is shot to be dropped at this timing, and each player object is controlled so as to catch or receive the ball object at the dropped timing, a melody assigned to the ball object is reproduced. Thus, it is possible to provide a rhythm game in a new sensation different from the rhythm game which is played merely based on a timing of pushing the button.

Furthermore, in this embodiment, kinds are provided to the ball object, and whereby, depending on the kind of the caught or received ball, the pitch of the melody may be changed. Also, the item object is provided, and whereby by obtaining the coin item, points can be earned, by the obstacle item (banana, iron ball), points may be subtracted, or the player object may not be moved. That is, a game element other than the rhythm game can be added, and whereby, it is possible to increase fun of the game.

Additionally, in this embodiment, by making the player object catch or receive a ball object such as a volley ball, as sound effect indicating catching or receiving the ball object is successful, a melody as to a main theme of the BGM is output, but a sub melody may be output.

Furthermore, in this embodiment, in a case that the point of impact of the ball object exists within the first predetermined range taking the player object as a center during the predetermined period, the ball object is caught, but in a case that a predetermined operation input is made in such a state, the ball object may be received. For example, as a predetermined operation input, a swinging operation of the first controller or an input of a predetermined key (turning on the A button 82*d*) may be applied.

In addition, in this embodiment, a ball object such as a volley ball is caught or received, and for identifying the corresponding player object, the same color as that assigned to the player object is applied to the ball object, but there is no need of being restricted thereto. For example, in place of the color, a pattern capable of identifying the player objects (facial image of the corresponding player object) is applied to the object, or an object capable of identifying the player object depending on the shape (circular, triangular pyramid-shaped, quadrangular pyramid-shaped, or columnar object, for example) and kinds (volley ball, baseball, tennis ball, soccer ball, for example) may be employed.

In addition, in this embodiment, the CPU of the game apparatus executes the game processing, but the respective processing for the game processing may be performed by a plurality of computers, or the like.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory storage medium storing a game program of a game apparatus that includes at least one processor, the game program comprising a rhythm game provided with a timing data storage storing timing data set to music, said game program comprising instructions, when executed by the at least one processor, that are configured to:
    move a player object to different positions within a three-dimensional game space based on an operation input provided by a player;
    set an arrival position within the three-dimensional game space for an object for determination, where the arrival position is set as a function of a position, within the three-dimensional game space, of the player object;
    move said object for determination in the three-dimensional game space so as to drop on a ground of the three dimensional game space at said arrival position at a first timing that is indicated by said timing data;
    perform a success determination depending on whether or not said player object is positioned within a first predetermined range from said arrival position for a predetermined period that includes the first timing that is indicated by the timing data; and
    control a sound output based on the performed success determination.

2. A non-transitory storage medium according to claim 1, wherein the arrival position is set such that said object for determination drops to the ground at a second predetermined range away from a position of said player object.

3. A non-transitory storage medium according to claim 1, wherein the arrival position is set such that said object for determination drops to the ground outside of a threshold distance from a position of said player object.

4. A non-transitory storage medium according to claim 1, wherein the operation input is based on a direction input operation performed on an operating device, and
the success determination is performed depending on whether or not said player object moves into a third predetermined range including the first predetermined range from said arrival position by the first timing, and a swinging operation of the operating device is performed within said predetermined period.

5. A non-transitory storage medium according to claim 1, wherein
the operation input is based on a direction input operation performed on the operating device, and
the success determination is performed depending on whether or not said player object moves into a third predetermined range including the first predetermined range from said arrival position by the first timing, and a predetermined key operation is performed on the operating device within said predetermined period.

6. A non-transitory storage medium according to claim 1, wherein;
when the performed success determination is success, the controlled sound output includes sound effects that represent success, and
when the performed success determination is failure, the controlled sound output includes sound effects that represent failure.

7. A non-transitory storage medium according to claim 1, wherein
the controlled sound output includes music in relation to said timing data as BGM, and
at least one of volume and a part of the BGM is increased when the performed success determination is successful, and at least one of the volume and the part of the BGM is decreased when the performed success determination is failure.

8. A non-transitory storage medium according to claim 1, the instructions further configured to:
move a plurality of player objects according to respective operations performed by a plurality of players.

9. A non-transitory storage medium according to claim 8, wherein
said object for determination has an appearance that identifies with a corresponding player object, and
the arrival position is set on the basis of the position of the corresponding player object.

10. A non-transitory storage medium according to claim 9, wherein the instructions are further configured to:
display an index indicating said first predetermined range so as to identify the corresponding player object at said arrival position.

11. A non-transitory storage medium according to claim 1, wherein the instructions are further configured to:
arrange an item object other than said object for determination in said three-dimensional game space, and
give said player object a predetermined effect depending on whether or not said player object touches said item object.

12. A computing apparatus, comprising:
a storage medium configured to store timing data that is set to music; and
a processing system that includes at least one processor, the processing system configured to:
move at least one virtual user object that is presented in a virtual space based on user provided input;
determine an arrival position within the virtual space for another object that is a non-user controlled object, wherein the arrival position is determined based on a position of a virtual user object within the virtual space;
automatically move, without input from the user, the another object from an originating position in the virtual space to the determined arrival position, the arrival of the another object at the determined arrival position being set in accordance with a first timing indicated by the stored timing data;
cause images of the virtual space to be displayed on a display screen, the images including the at least one virtual user object and the another object;
perform a determination that includes (1) whether or not the at least one virtual user object is positioned within a first predetermined range of the arrival position of the another object, and (2) whether the position of the at least one virtual user object within the first predetermined range occurs within a time period that is in accordance with the arrival of the another object at the arrival position at the first timing; and
control a sound output based on a result of the performed determination.

13. A game apparatus according to claim 12, wherein
the at least one virtual user object is a plurality of virtual user objects that are moved in accordance with respective input provided from a plurality of users.

14. A computing system, comprising:
a timing data storage configured to store timing data set to music;
a player object controller configured to move a player object in a three-dimensional game space based on an operation by a player;
an object mover configured to:
set an arrival position of an object for determination; and
move said object for determination in the three-dimensional game space so as to drop on a ground of the three dimensional game space at said arrival position at a timing indicated by said timing data; and
a determiner configured to perform a success determination depending on whether or not said player object is positioned within a first predetermined range from said arrival position for a predetermined period including said timing; and
a sound controller configured to control a sound output based on a result of the determination by said determiner,
wherein the arrival position is set in accordance with a position of the player object within the three-dimensional game space.

15. The computing system of claim 14, wherein
said player object controller is further configured to move each of a plurality of player objects according to an operation by each of a plurality of players.

16. A method of using a computing apparatus that is configured to store timing data set to music, the method comprising:
moving a virtual controlled player object that exists in a virtual world in accordance with operation input provided by a user;

setting an arrival position of a non-player controlled object;

automatically moving, without input from the user, the non-player controlled object from a first position within the virtual world to said arrival position, where the non-player controlled object is moved to the arrival position at a first timing that is in accordance with the timing data;

generating images of the game space that are to be displayed on a display screen, the generated images including representations of the player controlled object and the automatically moved non-player controlled object;

determining (1) whether or not said virtual player controlled object is positioned within a first predetermined range of the arrival position of the non-player controlled object, and (2) whether the position of the virtual controlled player object in the first predetermined range occurs within a predetermined period including said first timing;

controlling at least one process in accordance with the determination, wherein the arrival position is set in accordance with a position of the virtual controlled player object within the virtual world.

17. The method of claim 16, further comprising:

moving a plurality of virtual player objects according to respective operations provided by a plurality of users, wherein the arrival position of the non-player controlled object is set in accordance with a position of one of said plurality of virtual player objects.

* * * * *